(12) United States Patent
Bieberich et al.

(10) Patent No.: US 8,801,272 B2
(45) Date of Patent: *Aug. 12, 2014

(54) ZERO-HEAT-FLUX, DEEP TISSUE TEMPERATURE MEASUREMENT DEVICES WITH THERMAL SENSOR CALIBRATION

(75) Inventors: Mark T. Bieberich, Edina, MN (US); Gary L. Hansen, Eden Prairie, MN (US); Ryan J. Staab, Minneapolis, MN (US); Albert P. Van Duren, Chaska, MN (US); Allen H. Ziaimehr, Arden Hills, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,218

(22) Filed: Sep. 13, 2012

(65) Prior Publication Data

US 2013/0003776 A1 Jan. 3, 2013

Related U.S. Application Data

(63) Continuation of application No. 12/798,668, filed on Apr. 7, 2010, now Pat. No. 8,292,495.

(51) Int. Cl.
*G01K 15/00* (2006.01)
(52) U.S. Cl.
USPC .............................................. 374/1; 374/163
(58) Field of Classification Search
USPC .............. 374/1, 163, 164, 166, 208, E17.001, 374/141; 600/549
See application file for complete search history.

(56) References Cited

U.S. PATENT DOCUMENTS

| | | |
|---|---|---|
| 1,363,259 A | 12/1920 | Mills |
| 1,526,641 A | 2/1925 | Mulvany et al. |
| 1,528,383 A | 3/1925 | Schmidt |
| 1,638,943 A | 8/1927 | Little |
| 2,378,804 A | 6/1945 | Sparrow et al. |
| 2,381,819 A | 8/1945 | Graves et al. |
| 2,519,785 A | 8/1950 | Okolicsanyi |
| 2,629,757 A | 2/1953 | McKay |
| 2,807,657 A | 9/1957 | Jenkins et al. ............... 136/4 |
| 2,969,141 A | 1/1961 | Katzin .................... 206/16.5 |
| 3,099,575 A | 7/1963 | Hill ......................... 117/212 |
| 3,099,923 A | 8/1963 | Benzinger .................. 73/341 |
| 3,215,265 A | 11/1965 | Welin-Berger ........... 206/63.2 |

(Continued)

FOREIGN PATENT DOCUMENTS

| | | |
|---|---|---|
| CA | 2538940 | 6/2006 |
| CA | 2583034 | 9/2007 |

(Continued)

OTHER PUBLICATIONS

Fox RH, et al, A new technique for monitoring the deep body temperature in man from the intact skin surface. *J. Physiol.* 1971; 212(2): 8P-10P.

(Continued)

*Primary Examiner* — R. A. Smith
*Assistant Examiner* — Tania Courson
(74) *Attorney, Agent, or Firm* — X. Christina Huang

(57) ABSTRACT

A zero-heat-flux DTT measurement device is constituted of a flexible substrate supporting an electrical circuit including a heater trace defining a heater, thermal sensors, and a thermal sensor calibration circuit.

16 Claims, 16 Drawing Sheets

(56) References Cited

U.S. PATENT DOCUMENTS

| | | | | |
|---|---|---|---|---|
| 3,235,063 A | 2/1966 | Jarund | | 206/16.5 |
| 3,238,775 A | 3/1966 | Watts | | 73/190 |
| 3,301,394 A | 1/1967 | Baermann et al. | | 206/63.2 |
| 3,367,182 A | 2/1968 | Baxter | | 73/190 |
| 3,427,209 A | 2/1969 | Hager, Jr. | | 136/225 |
| 3,469,685 A | 9/1969 | Baermann | | 206/63.2 |
| 3,552,558 A | 1/1971 | Poncy | | 206/63.2 |
| 3,581,570 A | 6/1971 | Wortz | | 73/355 R |
| 3,607,445 A | 9/1971 | Hines | | 136/225 |
| 3,720,103 A | 3/1973 | Adams et al. | | 73/190 H |
| 3,767,470 A | 10/1973 | Hines | | 136/225 |
| 3,781,749 A | 12/1973 | Iles et al. | | 338/25 |
| 3,809,230 A | 5/1974 | Poncy | | 206/306 |
| 3,833,115 A | 9/1974 | Schapker | | 206/63.2 |
| 3,877,463 A | 4/1975 | Cary et al. | | 128/2 H |
| 3,933,045 A | 1/1976 | Fox et al. | | 73/359 |
| 3,942,123 A | 3/1976 | Georgi | | 328/1 |
| 4,022,063 A | 5/1977 | West et al. | | 73/362 |
| 4,024,312 A | 5/1977 | Korpman | | 428/343 |
| 4,142,631 A | 3/1979 | Brandriff | | 206/306 |
| 4,149,066 A | 4/1979 | Niibe | | |
| 4,182,313 A | 1/1980 | Aslan | | |
| 4,253,469 A | 3/1981 | Aslan | | 128/736 |
| 4,275,741 A | 6/1981 | Edrich | | 128/653 |
| 4,347,854 A | 9/1982 | Gosline et al. | | 128/736 |
| 4,407,292 A | 10/1983 | Edrich | | 128/653 |
| 4,494,550 A | 1/1985 | Blazek et al. | | 128/664 |
| 4,539,994 A * | 9/1985 | Baumbach et al. | | 600/358 |
| 4,541,734 A | 9/1985 | Ishizaka | | 374/169 |
| 4,572,213 A | 2/1986 | Kawahara | | 128/736 |
| 4,574,359 A | 3/1986 | Ishizaka et al. | | 364/557 |
| 4,577,976 A | 3/1986 | Hayashi et al. | | 374/29 |
| 4,592,000 A | 5/1986 | Ishizaka et al. | | 364/557 |
| 4,629,336 A | 12/1986 | Ishizaka | | 364/557 |
| 4,648,055 A | 3/1987 | Ishizaka et al. | | 364/557 |
| 4,652,145 A | 3/1987 | Bjornberg | | 374/164 |
| 4,669,049 A | 5/1987 | Kosednar et al. | | 364/557 |
| 4,747,413 A | 5/1988 | Bloch | | 128/736 |
| 4,841,543 A | 6/1989 | Dittmar et al. | | 374/44 |
| 4,859,078 A | 8/1989 | Bowman et al. | | 374/44 |
| 4,899,297 A | 2/1990 | Sano et al. | | 364/557 |
| 4,955,380 A * | 9/1990 | Edell | | 600/355 |
| 4,987,579 A | 1/1991 | Yoshinaka et al. | | 377/25 |
| 5,002,057 A | 3/1991 | Brady | | 128/652 |
| 5,015,102 A | 5/1991 | Yamaguchi | | 374/107 |
| 5,033,866 A | 7/1991 | Kehl et al. | | 374/179 |
| 5,040,901 A | 8/1991 | Suzuki | | 374/183 |
| 5,050,612 A | 9/1991 | Matsumura | | 128/670 |
| 5,062,432 A | 11/1991 | James et al. | | 128/736 |
| 5,088,837 A | 2/1992 | Shiokawa et al. | | 374/185 |
| 5,149,200 A | 9/1992 | Shiokawa et al. | | 374/185 |
| 5,172,979 A | 12/1992 | Barkley et al. | | 374/147 |
| 5,178,468 A | 1/1993 | Shiokawa et al. | | 374/185 |
| 5,199,436 A | 4/1993 | Pompei et al. | | 128/664 |
| 5,255,979 A | 10/1993 | Ferrari | | 374/158 |
| 5,263,775 A | 11/1993 | Smith et al. | | 374/134 |
| 5,293,877 A | 3/1994 | O'Hara et al. | | 128/736 |
| 5,483,190 A | 1/1996 | McGivern | | 327/34 |
| 5,516,581 A | 5/1996 | Kreckel et al. | | 428/317.3 |
| 5,576,224 A | 11/1996 | Yakura | | |
| 5,816,706 A | 10/1998 | Heikkila et al. | | 374/134 |
| 5,884,235 A | 3/1999 | Ebert | | 702/87 |
| 5,990,412 A | 11/1999 | Terrell | | 136/225 |
| 5,993,698 A | 11/1999 | Frentzel et al. | | 252/511 |
| 6,001,471 A | 12/1999 | Bries et al. | | 428/343 |
| 6,014,890 A | 1/2000 | Breen | | 73/29.02 |
| 6,019,507 A | 2/2000 | Takaki | | 374/161 |
| 6,059,452 A | 5/2000 | Smith et al. | | 374/169 |
| 6,203,191 B1 | 3/2001 | Mongan | | 374/43 |
| 6,220,750 B1 * | 4/2001 | Palti | | 374/164 |
| 6,224,543 B1 | 5/2001 | Gammons et al. | | 600/124 |
| 6,231,962 B1 | 5/2001 | Bries et al. | | 428/317.3 |
| 6,253,098 B1 | 6/2001 | Walker et al. | | 600/344 |
| 6,255,622 B1 | 7/2001 | May et al. | | 219/209 |
| 6,278,051 B1 | 8/2001 | Peabody | | 136/225 |
| 6,280,397 B1 | 8/2001 | Yarden et al. | | 600/549 |
| 6,283,632 B1 | 9/2001 | Takaki | | 374/161 |
| 6,292,685 B1 | 9/2001 | Pompei | | 600/474 |
| 6,312,391 B1 | 11/2001 | Ramadhyani et al. | | 600/549 |
| 6,355,916 B1 | 3/2002 | Siefert | | 219/494 |
| 6,377,848 B1 | 4/2002 | Garde et al. | | 604/20 |
| 6,398,727 B1 | 6/2002 | Bui et al. | | 600/300 |
| 6,495,806 B2 | 12/2002 | Siefert | | 219/494 |
| 6,501,364 B1 | 12/2002 | Hui | | |
| 6,553,243 B2 | 4/2003 | Gurley | | 600/340 |
| 6,595,929 B2 | 7/2003 | Stivoric et al. | | 600/549 |
| 6,676,287 B1 | 1/2004 | Mathis et al. | | 374/1 |
| 6,773,405 B2 | 8/2004 | Fraden et al. | | 600/549 |
| 6,827,487 B2 | 12/2004 | Baumbach | | 374/164 |
| 6,886,978 B2 * | 5/2005 | Tokita et al. | | 374/169 |
| 6,890,096 B2 * | 5/2005 | Tokita et al. | | 374/163 |
| 6,929,611 B2 | 8/2005 | Koch | | 600/549 |
| 7,059,767 B2 * | 6/2006 | Tokita et al. | | 374/163 |
| 7,249,883 B2 * | 7/2007 | Kuroda et al. | | 374/110 |
| 7,270,476 B2 | 9/2007 | Tokita et al. | | 374/107 |
| 7,284,904 B2 * | 10/2007 | Tokita et al. | | 374/163 |
| 7,299,090 B2 | 11/2007 | Koch | | 600/547 |
| 7,306,283 B2 | 12/2007 | Howick et al. | | 297/180.12 |
| 7,318,004 B2 | 1/2008 | Butterfield | | 702/130 |
| 7,322,743 B2 * | 1/2008 | Gozloo et al. | | 374/170 |
| 7,354,195 B2 | 4/2008 | Sakano | | 374/208 |
| 7,364,356 B2 | 4/2008 | Dicks et al. | | 374/121 |
| 7,410,291 B2 | 8/2008 | Koch | | 374/163 |
| 7,426,872 B2 | 9/2008 | Dittmar et al. | | 73/818 |
| 7,500,780 B2 | 3/2009 | Miki | | |
| 7,597,668 B2 | 10/2009 | Yarden | | |
| 7,625,117 B2 * | 12/2009 | Haslett et al. | | 374/111 |
| 7,632,008 B2 | 12/2009 | Recht | | |
| 7,896,545 B2 * | 3/2011 | Pan | | 374/178 |
| 7,988,355 B2 | 8/2011 | Gierer | | |
| 8,089,245 B2 | 1/2012 | Kato | | |
| 8,496,377 B2 * | 7/2013 | Harr et al. | | 374/163 |
| 2002/0097775 A1 | 7/2002 | Hamouda et al. | | 374/29 |
| 2002/0150143 A1 * | 10/2002 | Tokita et al. | | 374/163 |
| 2003/0130590 A1 | 7/2003 | Bui et al. | | 600/537 |
| 2004/0076215 A1 | 4/2004 | Baumbach | | 374/29 |
| 2004/0210280 A1 | 10/2004 | Liedtke | | 607/96 |
| 2005/0101843 A1 | 5/2005 | Quinn | | |
| 2005/0245839 A1 | 11/2005 | Stivoric et al. | | 600/549 |
| 2007/0167859 A1 | 7/2007 | Finneran et al. | | 600/546 |
| 2007/0206655 A1 | 9/2007 | Haslett et al. | | 374/141 |
| 2007/0282218 A1 | 12/2007 | Yarden | | 600/549 |
| 2008/0170600 A1 | 7/2008 | Sattler et al. | | 374/163 |
| 2008/0200969 A1 | 8/2008 | Weber | | |
| 2009/0129433 A1 | 5/2009 | Zhang et al. | | 374/102 |
| 2010/0121217 A1 | 5/2010 | Padiy | | |
| 2010/0134122 A1 | 6/2010 | Furumura | | |
| 2010/0220766 A1 | 9/2010 | Burgard | | |
| 2010/0268113 A1 | 10/2010 | Bieberich | | |
| 2010/0268114 A1 | 10/2010 | Van Duren | | |
| 2010/0292605 A1 | 11/2010 | Grassl et al. | | 600/549 |
| 2011/0051776 A1 | 3/2011 | Bieberich | | |
| 2011/0249699 A1 | 10/2011 | Bieberich | | |
| 2011/0249701 A1 | 10/2011 | Bieberich | | |
| 2011/0317737 A1 * | 12/2011 | Klewer et al. | | 374/29 |
| 2012/0024833 A1 * | 2/2012 | Klewer et al. | | 219/211 |
| 2012/0289855 A1 | 11/2012 | Bieberich | | |
| 2013/0010826 A1 | 1/2013 | Le Neel | | |

FOREIGN PATENT DOCUMENTS

| | | | | |
|---|---|---|---|---|
| DE | 3527942 A1 | 2/1987 | | G01K 7/00 |
| EP | 0239824 B1 | 5/1992 | | G01K 13/00 |
| GB | 2266771 A | 11/1993 | | G01K 1/18 |
| JP | 55-29794 | 3/1980 | | G01K 1/16 |
| JP | 57-183832 | 12/1982 | | A61B 5/00 |
| JP | H08-211000 | 8/1996 | | G01N 25/00 |
| JP | 2002202205 A | 7/2002 | | G01K 7/00 |
| JP | 2007-212407 A | 8/2007 | | A61B 5/01 |
| JP | 2009-080000 A | 4/2009 | | A61B 5/04 |
| WO | WO 99/60356 A1 | 11/1999 | | G01K 17/00 |
| WO | WO 00/58702 A1 | 10/2000 | | G01K 7/02 |
| WO | WO 01/31305 A1 | 5/2001 | | G01K 7/42 |
| WO | WO 02-066946 | 8/2002 | | |

(56) References Cited

FOREIGN PATENT DOCUMENTS

| WO | WO 2007/060609 A2 | 5/2007 | ............ A61B 5/040 |
|---|---|---|---|
| WO | WO 2008/068665 A1 | 6/2008 | ............ G01K 1/16 |
| WO | WO 2008/078271 A1 | 7/2008 | ............ G01K 1/16 |
| WO | WO 2009/141780 A1 | 11/2009 | ............ G01K 1/16 |
| WO | WO 2010/082102 A2 | 7/2010 | ............ G01K 1/14 |
| WO | WO 2010/103436 A1 | 9/2010 | ............ G01K 1/16 |
| WO | WO 2010/116297 A1 | 10/2010 | ............ G01K 1/14 |
| WO | WO 2010/120360 A1 | 10/2010 | ............ G01K 13/00 |
| WO | WO 2010/120362 A1 | 10/2010 | ............ G01K 13/00 |
| WO | WO 2011/025521 A1 | 3/2011 | ............ G01K 1/16 |
| WO | WO 2011/126543 A1 | 10/2011 | ............ G01K 13/00 |
| WO | WO 2011/146098 A1 | 11/2011 | ............ G01K 1/16 |
| WO | WO 2012-112222 | 8/2012 | |
| WO | WO 2012-154212 | 11/2012 | |

OTHER PUBLICATIONS

Solman AJ, et al, New thermometers for deep tissue temperature. *Biomedical Engineering* 1973; 8(10): 432-435.

Fox RH, et al, A new method for monitoring deep body temperature from the skin surface. *Clin. Sci.* 1973; 44: 81-86.

Togawa, T, et al, A modified internal temperature measurement device, *Medical and Biological Engineering*, May 1976, pp. 361-364.

Togawa T, Non-invasive deep body temperature measurement. In: Rolfe P (ed) *Non-invasive Physiological Measurements*. 1979; vol. 1: 261-277.

Zhang X, et al, Application of the Heat Flux Meter in Physiological Studies, *J. therm. Biol.*, 1993, vol. 18: 473-476. Yamakage M, et al, Deep temperature monitoring-comparative study between conventional and new developed monitors, *Anesthesiology*, 2002; 96: A501.

Suleman M-I, et al, Insufficiency in a new temporal-artery thermometer for adult and pediatric patients, *Anesth Analg*, 2002; 95: 67-71.

Yamakage M, et al., Evaluation of a newly developed monitor of deep body temperature, *J. Anesth.*, 2002; 16:354-357.

Thurbide, K., Excuse me, but my Band-Aid is beeping, Haslett's smart Band-Aid/University of Calgary, Jul. 18, 2007, pp. 1-2.

Gunga H-C, et al, A non-invasive device to continuously determine heat strain in humans. *J. Ther. Bio.* 2008; 33: 297-307.

Kimberger O, et al., Accuracy and precision of a novel non-invasive core thermometer.*BJA*. 2009; 103(2): 226-231.

Langham GE, et al, Noninvasive temperature monitoring in postanesthesia care units, *Anesthesiology*, 2009, 111; 1:1-7.

Kitamura, K, et al, Development of a new method for the noninvasive measurement of deep body temperature without a heater, *Med. Eng. Phys.*, 2010; 32(1): 1-6. Epub Nov. 10, 2009.

Zeiner A, et al, Non-invasive continuous cerebral temperature monitoring in patients treated with mild therapeutic hypothermia: an observational pilot study, *Resuscitation*, Jul. 2010; 81(7) 861-866. Epub Apr. 15, 2010.

International Search Report & Written Opinion, PCT/US2010/001108, Jul. 23, 2010.

International Search Report & Written Opinion, PCT/US2010/001104, Jul. 26, 2010.

International Search Report & Written Opinion, PCT/US2010/002185, Dec. 13, 2010.

International Search Report & Written Opinion, PCT/US2011/000549, Jun. 26, 2011.

International Search Report & Written Opinion, PCT/US2011/000552, Jun. 29, 2011.

\* cited by examiner

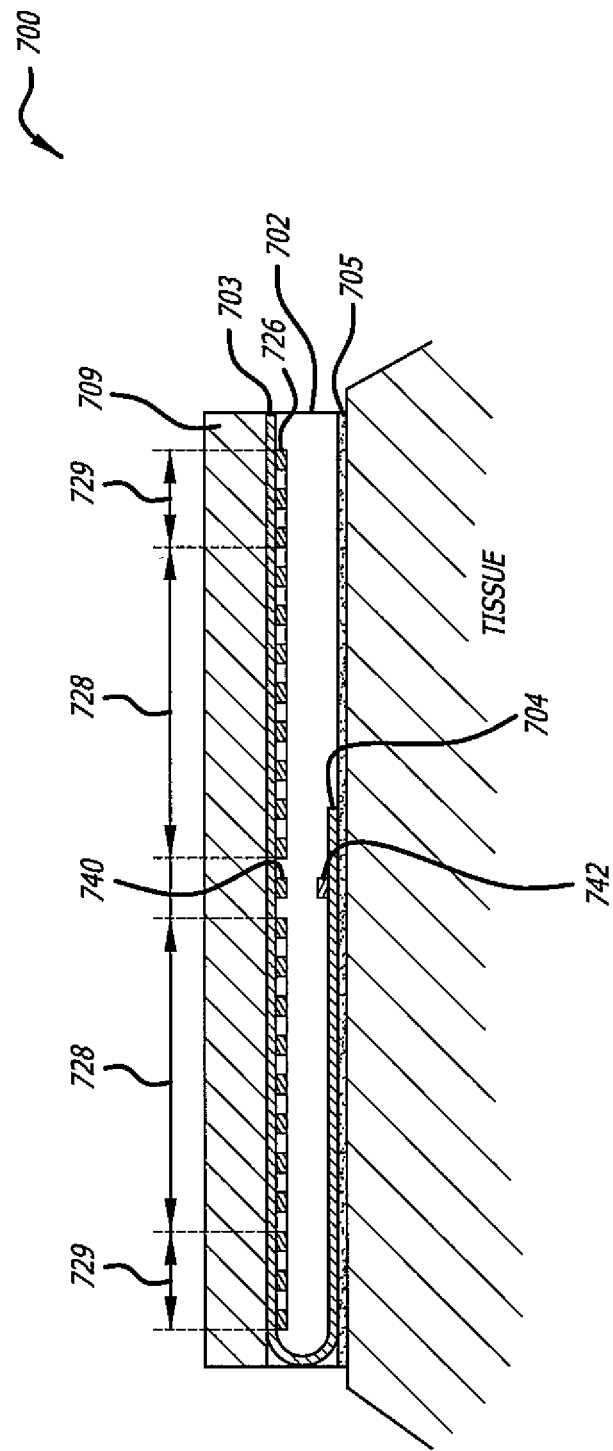

ZERO-HEAT-FLUX, DEEP TISSUE TEMPERATURE MEASUREMENT DEVICES WITH THERMAL SENSOR CALIBRATION

RELATED APPLICATIONS

This application is a continuation of U.S. patent application Ser. No. 12/798,668, filed Apr. 7, 2010.

RELATED APPLICATIONS

This application contains material related to the following US patent applications:
U.S. patent application Ser. No. 12/584,108, filed Aug. 31, 2009, now U.S. Pat. No. 8,226,294; and,
U.S. patent application Ser. No. 12/798,670, filed Apr. 7, 2012.

BACKGROUND

The subject matter relates to a device for use in the estimation of deep tissue temperature (DTT) as an indication of the core body temperature of humans or animals. More particularly, the subject matter relates to constructions of zero-heat-flux DTT measurement devices with provision for thermal sensor calibration.

Deep tissue temperature measurement is the measurement of the temperature of organs that occupy cavities of human and animal bodies (core body temperature). DTT measurement is desirable for many reasons. For example, maintenance of core body temperature in a normothermic range during the perioperative cycle has been shown to reduce the incidence of surgical site infection; and so it is beneficial to monitor a patient's body core temperature before, during, and after surgery. Of course noninvasive measurement is highly desirable, for the safety and the comfort of a patient, and for the convenience of the clinician. Thus, it is most advantageous to obtain a noninvasive DTT measurement by way of a device placed on the skin.

Noninvasive measurement of DTT by means of a zero-heat-flux device was described by Fox and Solman in 1971 (Fox R H, Solman A J. A new technique for monitoring the deep body temperature in man from the intact skin surface. J. Physiol. January 1971: 212(2): pp 8-10). The Fox/Solman system, illustrated in FIG. 1, estimates core body temperature using a temperature measurement device 10 with a controlled heater of essentially planar construction that stops or blocks heat flow through a portion of the skin. Because the measurement depends on the absence of heat flux through the skin area where measurement takes place, the technique is referred to as a "zero heat flux" (ZHF) measurement. Togawa improved the Fox/Solman technique with a DTT measurement device structure that accounted for multidimensional heat flow in tissue. (Togawa T. Non-Invasive Deep Body Temperature Measurement. In: Rolfe P (ed) Non-Invasive Physiological Measurements. Vol. 1. 1979. Academic Press, London, pp. 261-277). The Togawa device, illustrated in FIG. 2, encloses Fox and Solman's ZHF design in a thick aluminum housing with a cylindrical annulus construction that reduces or eliminates radial heat flow from the center to the periphery of the device.

The Fox/Solman and Togawa devices utilize heat flux normal to the body to control the operation of a heater that blocks heat flow from the skin through a thermal resistance in order to achieve a desired ZHF condition. This results in a construction that stacks the heater, thermal resistance, and thermal sensors of a ZHF temperature measurement device, which can result in a substantial vertical profile. The thermal mass added by Togawa's cover improves the stability of the Fox/Solman design and makes the measurement of deep tissue temperature more accurate. In this regard, since the goal is zero heat flux through the device, the more thermal resistance the better. However, the additional thermal resistance adds mass and size, and also increases the time required to reach a stable temperature.

The size, mass, and cost of the Fox/Solman and Togawa devices do not promote disposability. Consequently, they must be sanitized after use, which exposes them to wear and tear and undetectable damage. The devices must also be stored for reuse. As a result, use of these devices raises the costs associated with zero-heat-flux DTT measurement and can pose a significant risk of cross contamination between patients. It is thus desirable to reduce the size and mass of a zero-heat-flux DTT measurement device, without compromising its performance, in order to promote disposability after a single use.

An inexpensive, disposable, zero-heat-flux DTT measurement device is described and claimed in the priority application and illustrated in FIGS. 3 and 4. The device is constituted of a flexible substrate and an electrical circuit disposed on a surface of the flexible substrate. The electrical circuit includes an essentially planar heater which is defined by an electrically conductive copper trace and which surrounds an unheated zone of the surface, a first thermal sensor disposed in the zone, a second thermal sensor disposed outside of the heater trace, a plurality of electrical pads disposed outside of the heater trace, and a plurality of conductive traces connecting the first and second thermal sensors and the heater trace with the plurality of electrical pads. Sections of the flexible substrate are folded together to place the first and second thermal sensors in proximity to each other. A layer of insulation disposed between the sections separates the first and second thermal sensors. The device is oriented for operation so as to position the heater and the first thermal sensor on one side of the layer of insulation and the second thermal sensor on the other and in close proximity to an area of skin where a measurement is to be taken. As seen in FIG. 4, the layout of the electrical circuit on a surface of the flexible substrate provides a low-profile, zero-heat-flux DTT measurement device that is essentially planar, even when the sections are folded together.

Design and manufacturing choices made with respect to a zero-heat-flux DTT measurement device can influence the operation of the device. One such design choice relates to the thermal sensors used in the detection of the zero-heat-flux condition. Given the importance of core body temperature, it is very desirable that the thermal sensors produce accurate temperature data in order to enable reliable detection of the zero-heat-flux condition and accurate estimation of core body temperature. The tradeoff is between accuracy and cost of the thermal sensor. A number of thermal sensor devices are candidates for use in zero-heat-flux DTT measurement. Such devices include PN junctions, thermocouples, resistive temperature devices, and thermistors, for example. Thermistors are a good choice for reasons of small size, handling convenience, ease of use, and reliability in the temperature range of interest. Their relatively low cost makes them desirable candidates for single-use, disposable temperature measurement devices.

The magnitude of a thermistor's resistance changes in response to a change of the temperature of the thermistor. Thus, to determine the magnitude of the temperature, the thermistor's resistance is measured and converted to a temperature value using a known relationship. However, batchto-batch manufacturing variances can yield a large range variance in thermistor resistance. For example, low-cost thermistors can exhibit a range of ±5% in resistance values from device to device at a given temperature, which yields a range of ±2.5° C. in temperature. Such a large range in variance can compromise the accuracy and reliability of zero-heat-flux temperature measurement. Thus, while it is desirable to use such thermistors in order to limit the cost of parts and labor in manufacturing zero-heat-flux DTT measurement devices, it is important to reduce, if not remove, the effects of resistance variance on device operation.

The range of thermistor resistance variance can be neutralized by calibration of thermistor resistance using known methods, such as the Steinhart-Hart equation, which require knowledge of coefficients derived from values of thermistor resistance measured at fixed temperatures. When a thermistor is operated, the coefficients are used in known formulas to correct or adjust the magnitude of its indicated resistance. Such correction is called calibration.

Preferably, once determined, the coefficients are stored in a memory device so as to be available for use when the thermistor is operated. For example, as described in Japanese patent publication 2002-202205, a deep temperature measuring device includes a temperature probe constructed for zero-heat-flux measurement and a cable projecting from the probe. One end of the cable terminates on the probe, and the opposite end in a connector. Signal wires run in the cable between the probe and the connector. A read-only memory (ROM) is mounted in the connector casing, away from the probe. Information stored in the ROM includes probe classification and thermistor coefficients. Since the thermistor coefficients are unique to the thermistors on the probe, the ROM must be permanently associated with the probe, and so the cable is permanently fixed to the probe. The connector detachably plugs into a temperature measurement system. At start-up, the system reads the classification and coefficient information from the ROM. The system uses the coefficient information to calibrate thermistor readings obtained from the probe, thereby to reduce or remove the effects of resistance variation from the zero-heat-flux process.

The cable of the deep temperature measuring device with its permanent connector results in a complex construction that is costly to manufacture, difficult to store, and awkward to handle. A full complement of probes for a temperature measuring system has as many cables as probes. The probes are reusable, and so the problems described above in connection with the Fox/Solman and Togawa devices are compounded by the presence of the cables.

SUMMARY

An object of an invention completed in respect of the problems described above is to provide a zero-heat-flux DTT measurement device constituted of a flexible substrate and a zero-heat-flux electrical circuit disposed on a surface of the flexible substrate with thermal sensor calibration coefficients provided from a circuit mounted on the substrate.

Another object of an invention completed in respect of the problems described above is to eliminate a cable and connector as integral parts of a zero-heat-flux DTT probe without sacrificing the cost-saving benefits of inexpensive thermal sensors.

Another object of an invention completed in respect of the problems described above is to provide thermal sensor calibration for a zero-heat-flux DTT measurement device constituted of a flexible substrate and electrically conductive traces on a surface of the substrate for a heater and at least two thermal sensors.

These and other objects are achieved with a zero-heat-flux DTT measurement device constituted of a flexible substrate supporting an electrical circuit including a heater trace defining a heater, thermal sensors, and a thermal sensor calibration circuit.

Preferably, the thermal sensor calibration circuit includes a programmable memory storing thermal measurement information including thermal sensor calibration coefficients.

These and other objects are achieved with a zero-heat-flux DTT measurement device constituted of a flexible substrate including a center section, a tab extending from the periphery of the center section, and a tail extending from the periphery of the center section, and an electrical circuit on a surface of the flexible substrate, the electrical circuit including a heater trace defining a heater surrounding a zone of the surface, a first thermal sensor disposed in the zone, a second thermal sensor disposed on the tail, a memory device disposed on the substrate outside of the heater trace, a plurality of electrical pads disposed on the tab, and a plurality of conductive traces connecting the first and second thermal sensors, the memory device, and the heater trace with the plurality of electrical pads.

Preferably, the memory device includes a multi-pin memory device storing thermal measurement information including thermal sensor calibration coefficients

BRIEF DESCRIPTION OF THE DRAWINGS

FIG. 7A is a first side sectional, partly schematic illustration of a zero-heat-flux DTT measurement device illustrating components of a multi-layer construction.

DETAILED DESCRIPTION OF PREFERRED EMBODIMENTS

It is desirable that zero heat flux, deep tissue temperature measurement device constructions include on-board thermal sensor calibration information in order to remove the effects of thermal sensor variance on device operation.

A temperature device for zero-heat-flux DTT measurement includes a flexible substrate with at least two thermal sensors disposed in a spaced-apart relationship and separated by one or more flexible layers of thermally insulating material. Preferably the sensors are maintained in a spaced apart relationship by a flexible thermal (and electrical) insulator. The substrate supports at least the thermal sensors, the separating thermal insulator, a thermal sensor calibration circuit, and a heater.

Although temperature device constructions are described in terms of preferred embodiments comprising representative elements, the embodiments are merely illustrative. It is possible that other embodiments will include more elements, or fewer, than described. It is also possible that some of the described elements will be deleted, and/or other elements that are not described will be added. Further, elements may be combined with other elements, and/or partitioned into additional elements.

A Zero-Heat-Flux DTT Measurement Device

Figure 1:
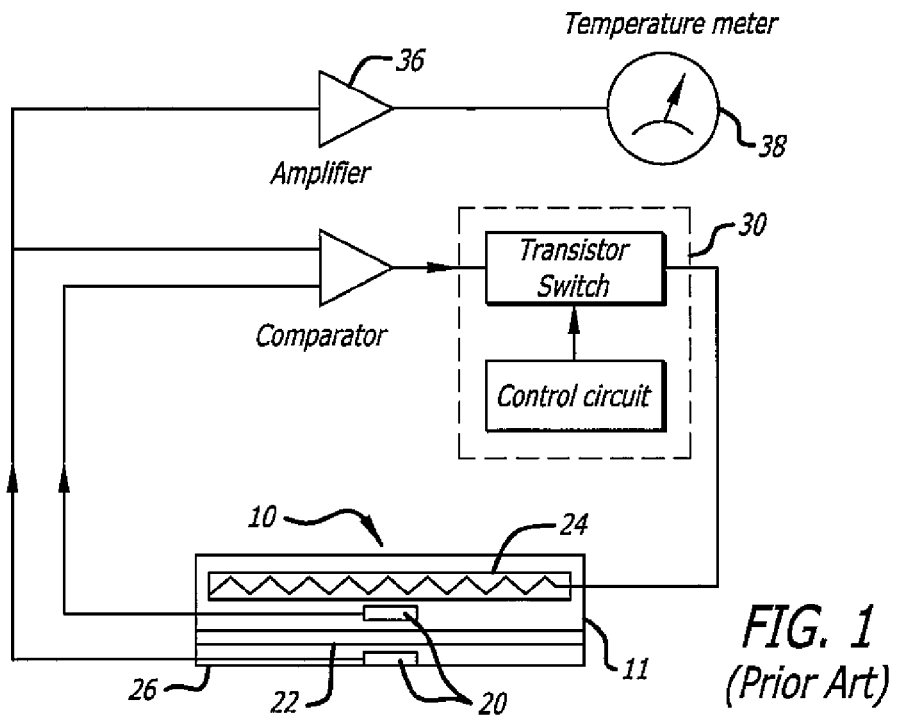
FIG. 1 is a schematic block diagram of a first prior art deep tissue temperature measurement system including a ZHF DTT measurement device.
Figure 2:
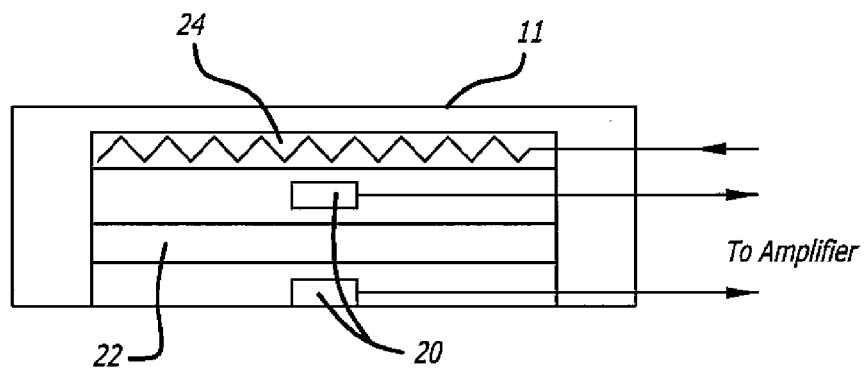
FIG. 2 is a schematic side sectional diagram of a second prior art deep tissue temperature measurement system including a ZHF deep tissue temperature measurement device with an aluminum cap.
Figure 3:
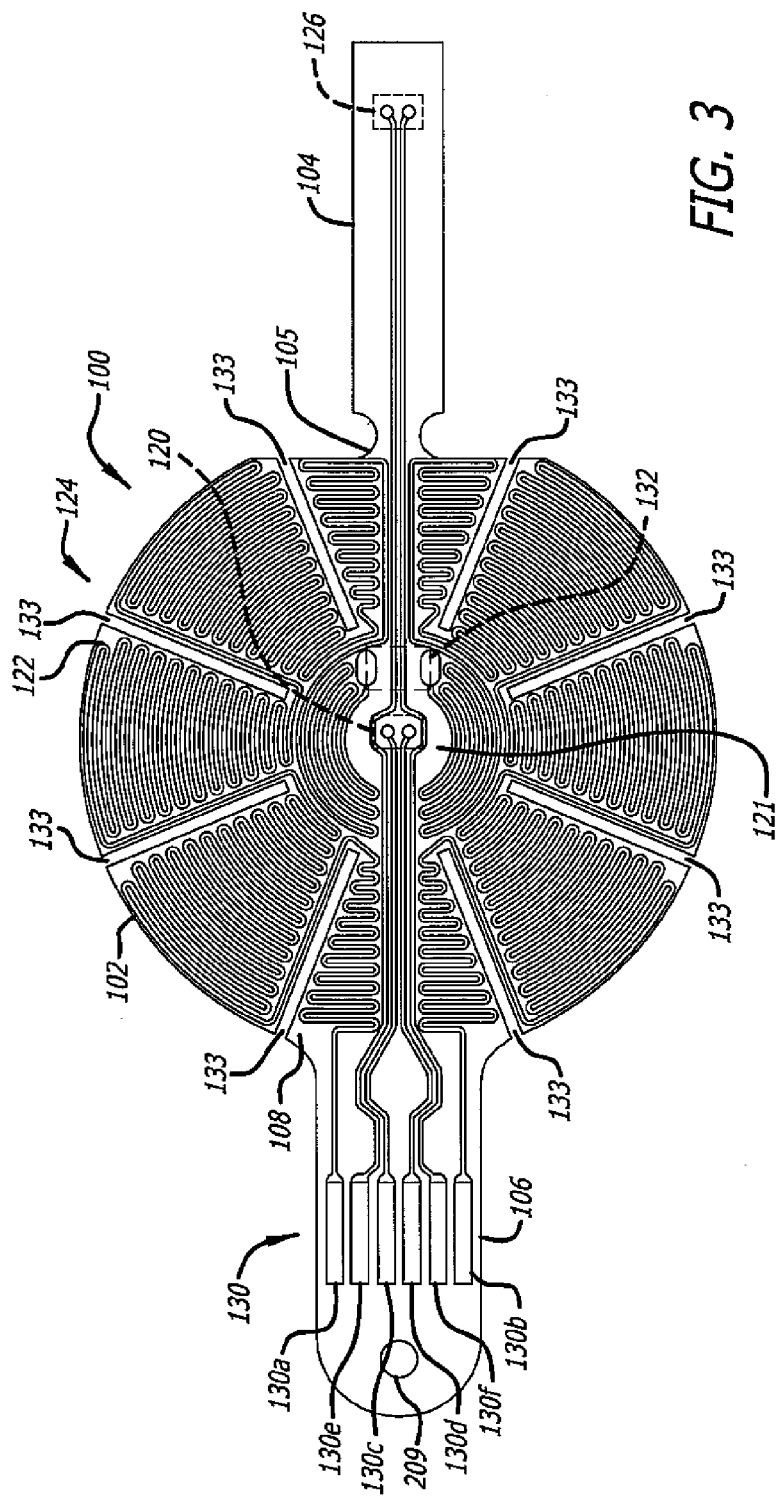
FIG. 3 is a plan view of a side of a flexible substrate showing an electrical circuit disposed on a surface of the substrate for temperature measurement.

A layout for a zero-heat-flux, DTT measurement device is illustrated in FIG. 3. The device includes an electrical circuit disposed on a flexible substrate in order to adapt or conform the physical configuration of the temperature measurement device to differing contours encountered at different temperature measurement locations. Preferably, but not necessarily, the flexible substrate is constructed or fabricated to have a plurality of contiguous sections. For example, the flexible substrate 100 has three contiguous sections 102, 104, and 106. The first, or center, section 102 is substantially circular in shape. The second section (or "tail") 104 has the shape of a narrow, elongate rectangle that extends in a first radial direction from the periphery of the first section 102. Where the center section and the tail join at 105, the periphery of the center section has a straight portion and the width of the tail is reduced. The third, or tab, section 106 has the shape of a broad, elongate rectangle that extends in a second radial direction from the periphery of the center section 102. Preferably, the tail and tab are aligned along a diameter of the center section.

As per FIG. 3, the elements of the electronic circuit are disposed on a single surface, on a first side 108 of the flexible substrate. A first thermal sensor 120 is positioned inside the outer perimeter of the center section 102, preferably near or at the center of the center section 102. An electrically conductive heater trace 122 defines a heater with a shape that surrounds or encircles a zone 121 in which the first thermal sensor 120 is located. In the preferred embodiment illustrated in FIG. 3, the heater trace has an annular shape that includes a circular array of wedge-shaped heater zones 124 that surround or encircle the zone 121 and the first thermal sensor 120 which is disposed in the zone. A second thermal sensor 126 is positioned on the tail 104. A plurality of electrical connection pads 130 is located on the tab 106. The heater trace includes two electrically conductive trace sections that terminate in the connection pads 130a and 130b. Two electrically conductive traces extend between mounting pads on which the first thermal sensor 120 is mounted and the connection pads 130c and 130d. Two additional electrically conductive traces extend between mounting pads on which the second thermal sensor 126 is mounted and the connection pads 130e and 130f.

In the specific layout shown of the preferred embodiment shown in FIG. 3, the path of the heater trace 122 crosses the paths of the two traces for the second thermal sensor 126. In this case, the continuity of the heater trace is preferably, but not necessarily, maintained by an electrically conductive zero-ohm jumper 132 which crosses, and is electrically isolated from, the two traces for the second thermal sensor 126. In other embodiments, the continuity of the heater trace 122 can also be maintained by vias to the second side of the flexible substrate, by running the thermal sensor traces around the periphery of the first side of the flexible substrate, by a jumper wire instead of the zero-ohm resistor, or by any equivalent solution.

The flexibility or conformability of the flexible substrate can be enhanced by a plurality of slits 133 that define zones which move or flex independently of each other. In the preferred embodiment, the slits 133 are made in the center section 102 in a pattern that follows or accommodates the layout of the heater trace 122. The pattern at least partially separates the heater zones 124 so as to allow any one of the heater zones 124 to move independently of any other heater zone. The preferred pattern of slits is a radial pattern in that each slit is made along a respective radius of the circular center section 102, between adjacent heater zones, and extends along the radius from the periphery of the center section 102 toward the center of the circular shape of the section. This is not meant to exclude other possible slit configurations determined by the different shapes of the heater trace layout and the flexible substrate sections.

Sections of the flexible substrate are brought or folded together about an insulator to provide thermal resistance between the first and second thermal sensors 120 and 126 in a configuration that is preferred for ZHF temperature measurement. For example, at least the center and tail sections 102 and 104 of the flexible substrate are brought or folded together about a flexible insulator. Preferably, the first and second thermal sensors 120 and 126 are thereby disposed on respective sides of a thermal insulator. In this regard, with reference to FIGS. 3 and 4, the center section 102 and tail 104 are folded together about a flexible layer of insulating material 140. The layer 140 provides thermal and electrical resistance between the thermal sensors; it also supports the thermal sensors in a spaced-apart configuration.

Figure 4:
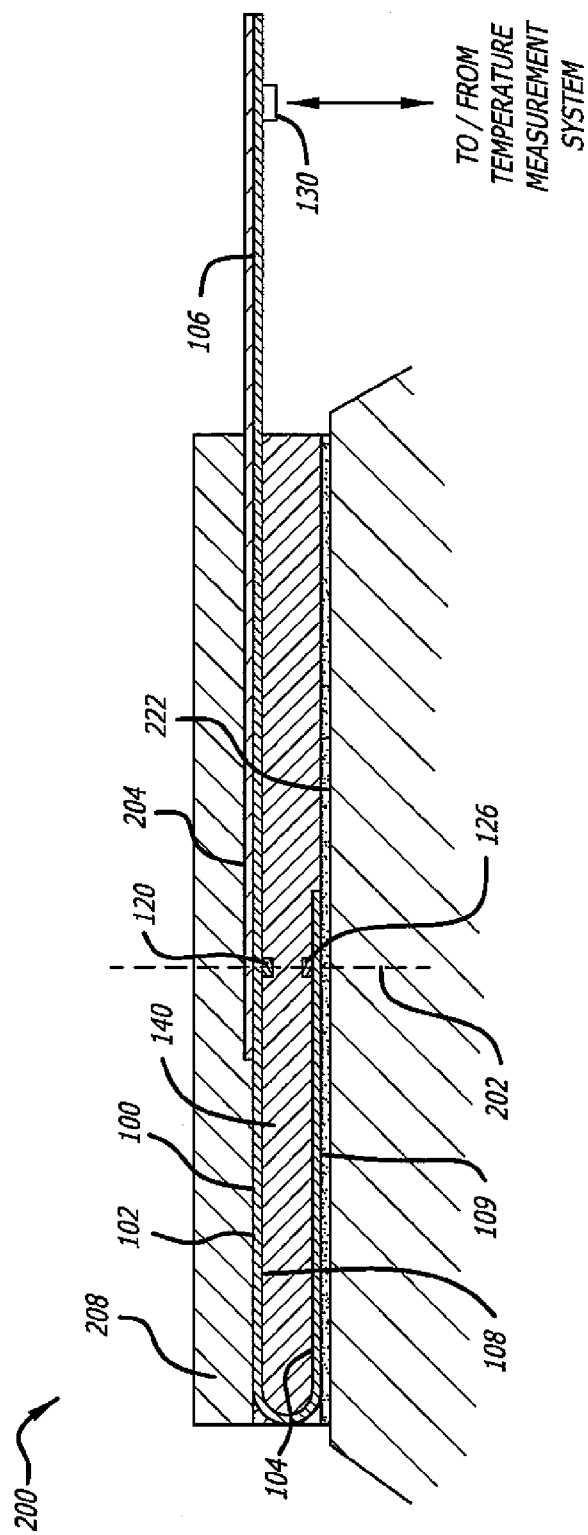
FIG. 4 is a side sectional view of a temperature device that incorporates the electrical circuit of FIG. 3.

A flexible temperature measurement device construction includes an electrical circuit laid out on a side of a flexible substrate as shown in FIG. 3. With two sections of the flexible substrate brought or folded together so as to sandwich a flexible insulator, the construction has a multilayer structure as best seen in FIG. 4. Thus, a temperature measurement device 200 includes the electrical circuit laid out on the surface of the first side 108 of the flexible substrate 100. The central and tail sections 102 and 104 are brought or folded together about the flexible insulating layer 140 so as to provide a thermal resistance between the first and second thermal sensors 120 and 126. The flexible insulating layer also maintains the first and second thermal sensors disposed in a spaced relationship. Preferably, but not necessarily, the second thermal sensor 126 is aligned with the first thermal sensor on a line 202 which passes through the zone 121 that is surrounded by the heater trace (seen in FIG. 3). The temperature measurement device further includes a flexible heater insulator 208 attached to a second side 109 of the substrate 100, over the center section 102.

The layout of the electrical circuit illustrated in FIG. 3 locates all of the circuit components on a single surface on one side of the flexible substrate 100. This layout confers several advantages. First, it requires only a single fabrication sequence to lay down traces for the heater, the thermal sensors, and the connection pads, thereby simplifying manufacture of the device. Second, when the sections carrying the thermal sensors are folded together, the thermal sensors are maintained within a thermally and mechanically controlled environment.

Another benefit of the preferred layout shown in FIG. 3 is that the first thermal sensor 120 is physically separated from the heater, in a zone 121 that is surrounded or encircled by the heater trace 122, and not stacked under it as in the Fox/Solman system. When the temperature measurement device is activated, the heater is turned on and the heat produced thereby travels generally vertically from the heater to the patient, but only medially to the first thermal sensor. As a result, the jump in temperature that occurs when the heater is activated is not immediately sensed by the first thermal sensor, which improves control of the heater and stability of the temperature measurement without requiring an increase in thermal mass of the temperature measurement device. Thus, the first temperature sensor 120 is preferably located in the same plane, or on the same surface, as the heater trace 122 (and can even be elevated slightly above the heater trace), and substantially in or in alignment with the zone 121 of zero heat flux.

It is desirable that the temperature measurement device support a pluggable interface for convenience and for modularity of a patient vital signs monitoring system. In this regard, and with reference to FIGS. 3 and 4, the tab 106 is configured with the array of pads 130 so as to be able to slide into and out of connection with a connector (not shown). In order to provide a physically robust structure capable of maintaining its shape while being connected and disconnected, the tab 106 is optionally stiffened. In this regard, a flexible stiffener 204 is disposed on the second side 109 of the flexible substrate 100. The stiffener extends substantially coextensively with the tab 106 and at least partially over the center section 102. As best seen in FIG. 4, the stiffener 204 is disposed between the second side 109 of the flexible substrate 100 and the flexible insulator 208. A key to align the tab 106 and prevent misconnection with an electrical connector (not shown) and to retain the connector on the tab may be provided on the device 200. For example, with reference to FIG. 5, such a key includes an opening 209 through the stiffener and tab. In operation, the opening 209 would receive and retain a retractable, spring-loaded pawl on the casing of a connector.

The temperature measurement device 200 is mounted on a region of skin where temperature is to be measured with the second thermal sensor 126 closest to the skin. As seen in FIG. 4, a layer of adhesive 222 is disposed on the second side 109, on the layer of insulation 140 and the portion of the tail 104 where the second sensor 126 is located. A release liner (not shown in this figure) may be peeled from the layer of adhesive 222 to prepare the device 200 for attachment to the skin. When deployed as shown in FIG. 4, a pluggable signal interface between the electrical circuit on the device 200 and a temperature measurement system is provided through the plurality of electrical connection pads 130 located in the tab 106. The signals transferred therethrough would include at least heater activation and thermal sensor signals.

Use of an electrical circuit on a flexible substrate greatly simplifies the construction of a disposable temperature device for estimating deep tissue temperature, and substantially reduces the time and cost of manufacturing such a device. In this regard, manufacture of a temperature measurement device incorporating an electrical circuit laid out on a side of the flexible substrate 100 with the circuit elements illustrated in FIG. 3 may be understood with reference to FIGS. 5 and 6A-6F. Although a manufacturing method is described in terms of specifically numbered steps, it is possible to vary the sequence of the steps while achieving the same result. For various reasons, some of the steps may include more operations, or fewer, than described. For the same or additional reasons, some of the described steps may be deleted, and/or other steps that are not described may be added. Further, steps may be combined with other steps, and/or partitioned into additional steps.

Figure 6A:
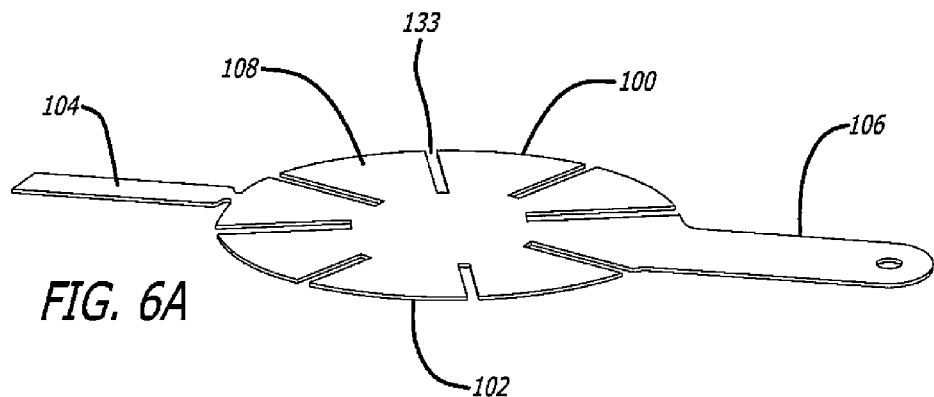
FIGS. 6A-6F illustrate a method of temperature device manufacture based on the temperature device of FIGS. 4 and 5.

In FIG. 6A, the traces and pads for an electrical circuit are fabricated on a first side 108 of a flexible substrate 100 with a center section 102, a tail 104 extending from the center section, and a tab 106 extending from the center section. The electronic elements (first and second thermal sensors) are mounted to the traces to complete an electrical circuit (which is omitted from these figures for convenience) including the elements of FIG. 3, laid out as shown in that figure. If used, the pattern of slits 133 separating the heater zones may be made in the center section in this manufacturing step.

Figure 5:
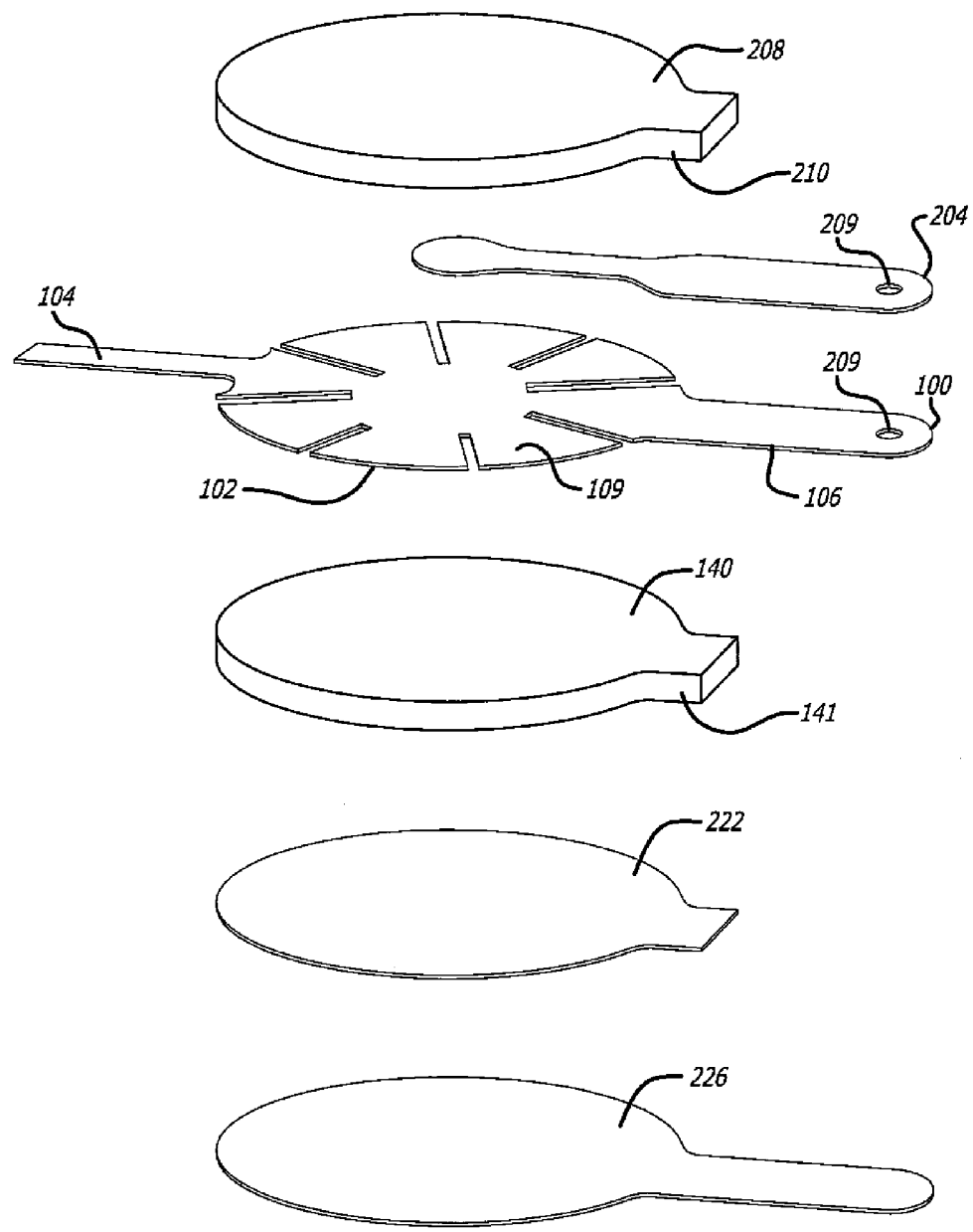
FIG. 5 is an exploded assembly view, in perspective, showing elements of the temperature device of FIG. 4.
Figure 6B:
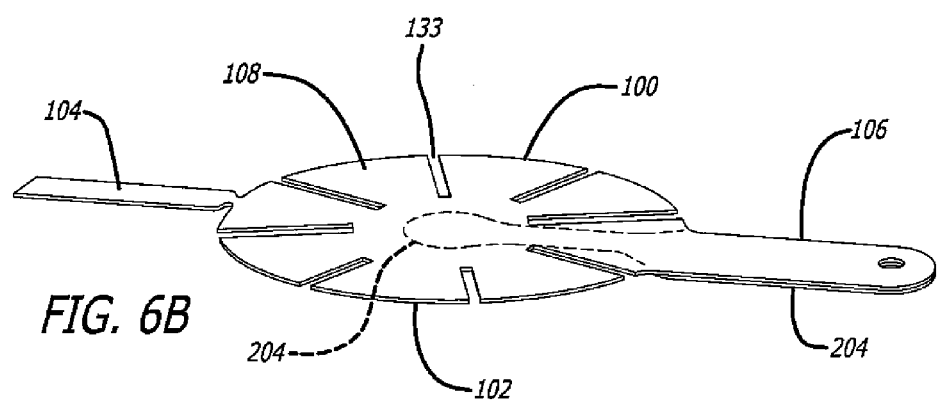

As per FIG. 6B, in a second manufacturing step, a stiffener 204 is laminated to a second side of the flexible substrate. As best seen in FIG. 5, the stiffener has a portion shaped identically to the tab and narrows to an elongated portion with a circular tip. When laminated to the second side 109, the stiffener substantially extends over the tab and partially over the center section, beneath the zone 121 where the first thermal sensor is located. Preferably, an adhesive film (not seen), or equivalent, attaches the stiffener to the second side of the flexible substrate.

Figure 6C:
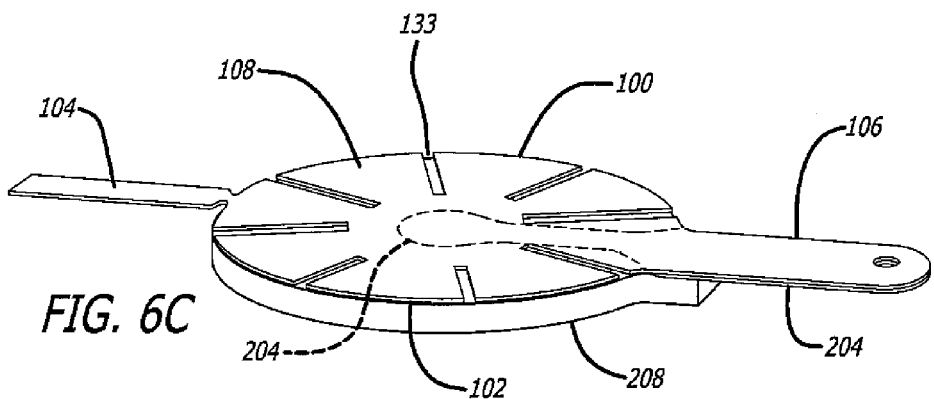

As per FIG. 6C, in a third manufacturing step, a flexible layer 208 of insulating material is attached by adhesive or equivalent to the first side of the flexible substrate, over substantially all of the center section and at least a portion of the stiffener. This layer is provided to insulate the heater from the ambient environment. As best seen in FIG. 5, this flexible layer may include a truncated tab 210 that provides additional reinforcement to a pluggable connection between the tab 106 and a system connector.

Figure 6D:
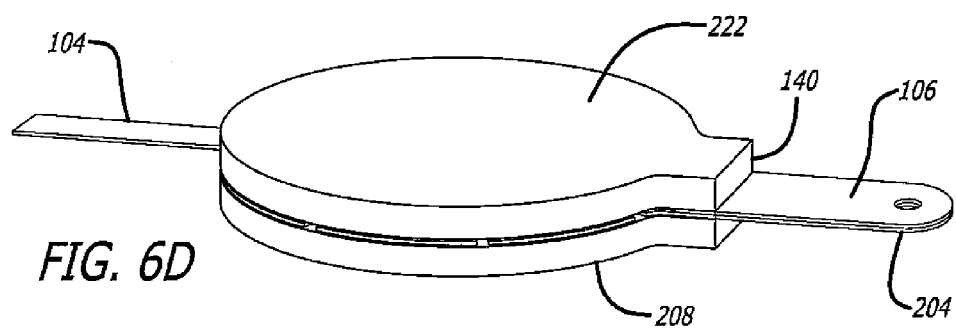

As per FIG. 6D, in a fourth manufacturing step, a flexible central layer of insulating material 140 is attached to the first side 108, over the center section, to cover the heater trace and the first thermal sensor. As best seen in FIG. 5, this flexible layer may also include a truncated tab 141 that provides additional reinforcement to a pluggable connection between the tab and a system connector.

Figure 6E:
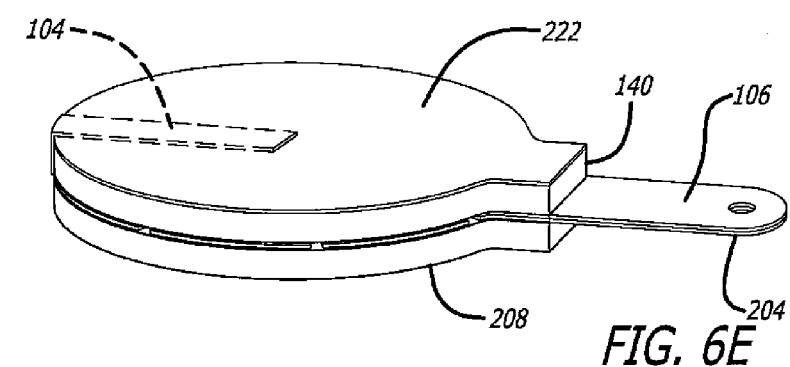

As per FIG. 6E, in a fifth manufacturing step, the tail 104 is folded over the central layer of insulating material 140 such that the first and second thermal sensors are maintained by the central layer in the preferred spaced relationship.

Figure 6F:
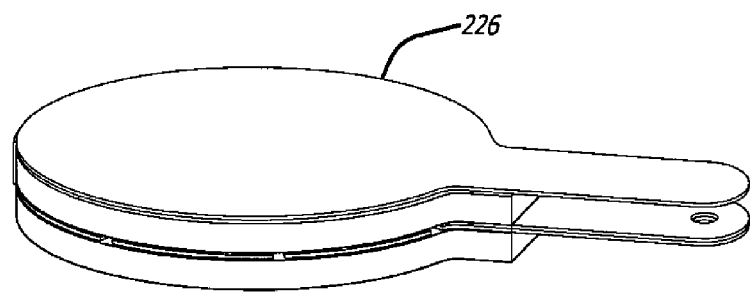

As per FIG. 6F, in a sixth manufacturing step, a layer of adhesive (not seen) with a release liner 226 is attached to the central insulating layer, over the central insulating layer with the tail folded thereto. As best seen in FIG. 5, the release liner 226 may have a shape that corresponds to the central section 102 and tab 106.

In a best mode of practice, a temperature measurement device according to this specification has been fabricated using the materials and parts listed in the following table. An electrical circuit with copper traces and pads conforming to FIG. 3 was formed on a flexible substrate of polyimide film by a conventional photo-etching technique and thermal sensors were mounted using a conventional surface mount technique. The dimensions in the table are thicknesses, except that Ø signifies diameter. Of course, these materials and dimensions are only illustrative and in no way limit the scope of this specification. For example, traces may be made wholly or partly with electrically conductive ink.

| Table of Materials and Parts: I | | |
| --- | --- | --- |
| Element | Material | Representative dimensions |
| Flexible substrate | Kapton ® polyimide film with deposited and photo-etched copper traces and pads | Substrate 100: 0.05 mm |
| Thermal sensors | NTC thermistors, Part # R603-103F-3435-C, Redfish Sensors | |
| Flexible insulating layers | Closed cell polyethylene foam with skinned major surfaces coated with pressure sensitive adhesive (PSA) | Insulator 208: Ø50 × 1.5 mm<br>Insulator 140: Ø50 × 3.0 mm |
| Stiffener | Polyethylene terephthalate (PET) | Stiffener 204: 0.25 mm |

Zero-Heat-Flux DTT Measurement Devices with Thermal Sensor Calibration

Zero-heat-flux DTT measurement devices according to FIG. 3 and the preceding description have been fabricated, assembled, and clinically tested. We have found that it is desirable to further adapt the construction of such devices by provision of thermal sensor calibration circuitry that enables reliable estimation of deep tissue temperature measurement by zero-heat-flux operation. Desirably, the placement of the thermal sensor calibration circuitry on the measurement devices and provision of a pluggable connector interface at the periphery of the measurement device eliminate the need for a cable permanently fixed to the measurement device.

These objectives are met by zero-heat-flux DTT measurement device constructions with a flexible substrate that supports an electrical circuit in which a heater trace is disposed on a first substrate layer to define a heater facing one side of a layer of thermally insulating material and surrounding a zone of the first substrate layer, a first thermal sensor is disposed in the zone, a thermal sensor calibration circuit is disposed on the first substrate layer outside of the heater, a second thermal sensor is disposed on the second substrate layer, a plurality of electrical pads is disposed outside of the heater trace on a substrate surface, and a plurality of conductive traces connects the heater trace, the first and second thermal sensors and the thermal sensor calibration circuit with the plurality of electrical pads.

These objectives are also met by zero-heat-flux DTT measurement device constructions with a flexible substrate that supports an electrical circuit in which a heater trace is disposed on a first substrate layer to define a heater facing one side of a layer of thermally insulating material and surrounding a zone of the first substrate layer, a first thermal sensor is disposed in the zone, a second thermal sensor is disposed on the second substrate layer, and a plurality of electrical contact pads is disposed outside of the heater trace on a substrate surface to provide an interface where a connector can be detachably coupled to the measurement device. A memory device storing thermal sensor calibration information is disposed on the first substrate layer, and a plurality of conductive traces connects the heater trace, the first and second thermal sensors and the memory device with the plurality of electrical pads.

Figure 7B:
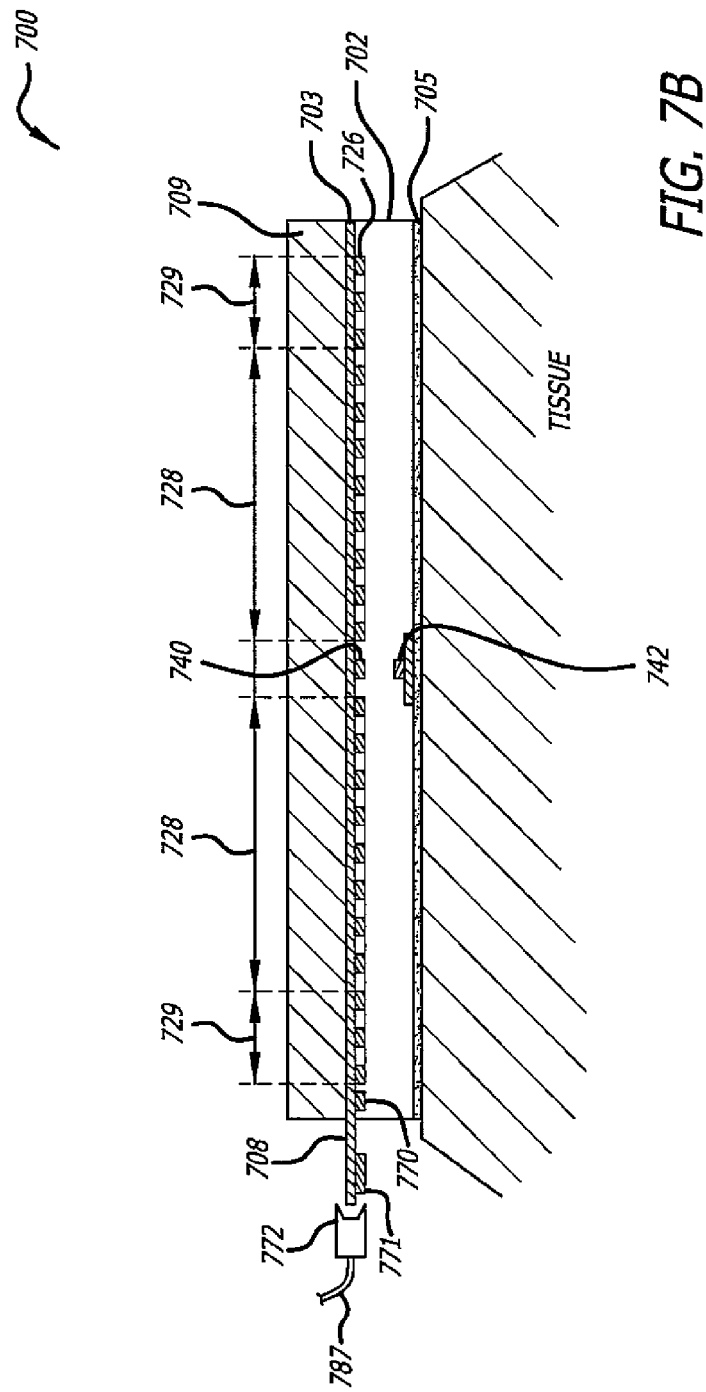
FIG. 7B is a second side sectional, partly schematic illustration of the zero-heat-flux DTT measurement device of FIG. 7A rotated to illustrate a thermal sensor calibration circuit included in the multi-layer construction.

FIG. 7A is a sectional, partially-schematic illustration of a preferred zero-heat-flux DTT measurement device construction. FIG. 7B is a sectional, partially-schematic illustration of the preferred zero-heat-flux DTT measurement device construction in which the section is rotated from the view of FIG. 7A. Not all elements of the measurement device are shown in these figures; however, the figures do show relationships between components of the construction that are relevant to zero-heat-flux measurement with thermal sensor calibration. As per FIG. 7A, the measurement device 700 includes flexible substrate layers, a layer of thermally insulating material, and an electrical circuit. The electrical circuit includes a heater 726, a first thermal sensor 740, and a second thermal sensor 742. The heater 726 and the first thermal sensor 740 are disposed in or on a flexible substrate layer 703, and the second thermal sensor 742 is disposed in or on a flexible substrate layer 704. The first and second substrate layers 703 and 704 are separated by a flexible layer 702 of thermally insulating material. The flexible substrate layers 703 and 704 can be separate elements, but it is preferred that they be sections of a single flexible substrate folded around the layer of insulating material. Preferably, adhesive film (not shown) attaches the substrate to the insulating layer 702. A layer of adhesive material 705 mounted to one side of the substrate layer 704 is provided with a removable liner (not shown) to attach the measurement device to skin. Preferably, a flexible layer 709 of insulating material lies over the layers 702, 703, and 704 and is attached by adhesive film (not shown) to one side of the substrate layer 702. The insulating layer 709 extends over the heater 726 and the first thermal sensor 740.

As seen in FIG. 7B, the electrical circuit further includes a thermal sensor calibration circuit 770 and electrical pads 771 disposed in or on the flexible substrate layer 703. The thermal sensor calibration circuit 770 is positioned outside of the heater 726, preferably between the heater 726 and the electrical pads 771. The electrical pads 771 are positioned on a section 708 of the substrate layer 703 that projects beyond the insulating layer 709 so as to be detachably coupled with a connector 772 fixed to the end of a cable 787. As will be explained in detail with reference to other figures, the thermal calibration circuit 770 includes a programmable memory storing thermal sensor calibration and other information. Presuming that the thermal sensors 740 and 742 are thermistors, the thermal sensor calibration information can include one or more unique calibration coefficients for each thermistor. Location of the thermal sensor circuit on the measurement device 700, between the heater 726 and the electrical pads 771 permanently associates the stored thermal sensor calibration information with the measurement device 700. Thus, the need for a cable, with connector, permanently attached to the measurement device is eliminated. Moreover, since the cable 787 and connector 772 do not store unique calibration information, they can be used for any zero-heat-flux DTT measurement device configured in accordance with FIGS. 7A and 7B. Finally, location of the thermal sensor circuit 770, with stored thermal sensor calibration information, on the measurement device 700, enables use of low cost thermal sensors.

With reference to FIGS. 7A and 7B, the measurement device 700 is disposed with the second thermal sensor 742 nearest the skin. The layer 702 is sandwiched between the first and second substrate layers 703 and 704 so as to separate the heater 726 and first thermal sensor 740 from the second thermal sensor 742. In operation, the layer 702 acts as a large thermal resistance between the first and second thermal sensors, the second thermal sensor 742 senses the temperature of the skin, and the first thermal sensor senses the temperature of the layer 702. While the temperature sensed by the first thermal sensor 740 is less than the temperature sensed by the second thermal sensor 742, the heater is operated to reduce heat flow through the layer 702 and the skin. When the temperature of the layer 702 equals that of the thermal sensor 742, heat flow through the layer 702 stops and the heater is switched off. This is the zero-heat-flux condition as it is sensed by the first and second sensors 740 and 742. When the zero-heat-flux condition occurs, the temperature of the skin, indicated by the second thermal sensor, is interpreted as core body temperature. In some zero-heat-flux DTT measurement device constructions that are to be described in detail, the heater 726 can include a central heater portion 728 that operates with a first power density, and a peripheral heater portion 729 surrounding the central heater portion that operates with a second power density higher than the first power density. Of course, the flexibility of the substrate permits the measurement device 700, including the heater 726, to conform to body contours where measurement is made.

Figure 8A:
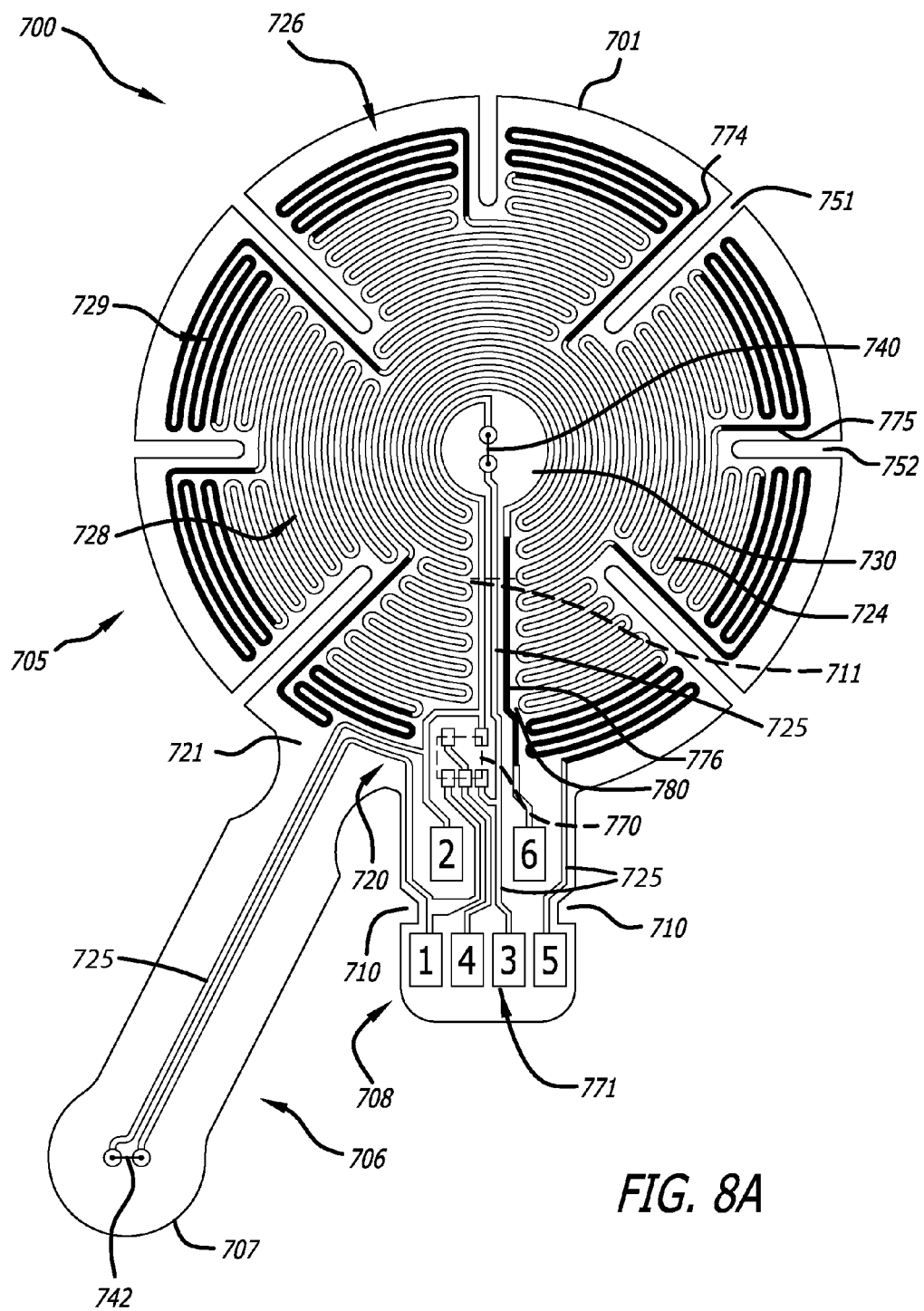
FIG. 8A illustrates a first construction of the zero-heat-flux DTT measurement device construction of FIG. 7.

With reference to FIG. 8A, a first construction of a zero-heat-flux DTT measurement device 700 with thermal sensor calibration includes a flexible substrate 701. Preferably, but not necessarily, the flexible substrate 701 has contiguous sections 705, 706, and 708. Preferably, but not necessarily, the first, or center, section 705 is substantially circular in shape. The second section (or "tail") 706 has the shape of a narrow, elongated rectangle with a bulbous end 707 that extends outwardly from the periphery of the center section 705 in a first direction. The third section (or "tab") is the extended section 708 seen in FIG. 7B. The tab 708 has the shape of a wide rectangle that extends outwardly from the periphery of the center section 705 in a second direction. Opposing notches 710 are formed in the tab 708 to receive and retain respective spring-loaded retainers of a connector (such as the connector 772 seen in FIG. 7B). Preferably but not necessarily, the tail 706 is displaced from the tab 708 by an arcuate distance of less than 180° in either a clockwise or a counterclockwise direction.

As per FIG. 8A, an electrical circuit 720 is disposed on the flexible substrate 701. Preferably, but not necessarily, the elements of the electrical circuit 720 are located on the surface 721 of the flexible substrate 701. The electrical circuit 720 includes at least an electrically conductive heater trace, thermal sensors, a thermal sensor calibration circuit, electrically conductive connective trace portions, and electrical connection pads. The heater trace 724 defines a generally annular heater 726 surrounding a zone 730 of the substrate 701 into which no portion of the heater trace 724 extends; in this regard, the zone 730 is not directly heated when the heater operates. The zone 730 occupies a generally circular portion of the surface 721. More completely, the zone 730 is a cylindrical section of the substrate 701 which includes the portion of the surface 721 seen in FIG. 8A, the counterpart portion of the opposing surface (not seen in this figure), and the solid portion therebetween. Preferably, but not necessarily, the zone 730 is centered in the center section 705 and is concentric with the heater 726. The first thermal sensor 740 is mounted on mounting pads formed in the zone 730. The second thermal sensor 742 is mounted on mounting pads disposed outside of the generally annular heater 726; preferably, these mounting pads are formed generally near the end of the tail 706, for example, in or near the center of the bulbous end 707 of the tail. In some constructions the thermal sensor calibration circuit 770 includes at least one multi-pin electronic circuit device mounted on the measurement device 700. For example the thermal sensor calibration circuit 770 can be constituted of an electrically-erasable programmable read/write memory (EEPROM) mounted on mounting pads formed on a portion of the surface 721 on the center section 705 near or adjacent the tab 708. The electrical connection pads ("electrical pads") 771 are formed on the surface 721, in the tab 708. A plurality of conductive trace portions 725 connects the first and second thermal sensors, the thermal sensor calibration circuit 770, and the heater trace 724 with a plurality of the electrical pads 771. Preferably, but not necessarily, at least one electrical pad 771 is shared by the thermal sensor calibration circuit 770 and one of the heater 726, the first thermal sensor 740, and the second thermal sensor 742.

As seen in FIG. 8A, preferably, but not necessarily, the center section 705 has formed therein a plurality of slits 751, 752 to enhance the flexibility and conformability of the flexible substrate. The slits extend radially from the periphery toward the center of the center section 705. The slits define zones which move or flex independently of each other. The layout of the heater trace 724 is adapted to accommodate the slits. In this regard, the heater trace follows a zigzag or switchback pattern with legs that increase in length from the periphery of the zone 730 to the ends of the longer slits 751 and then, after a step decrease at those ends, generally increase in length again to the outer periphery of the heater 726 in the zones defined by the slits. As illustrated, the construction of the heater has a generally annular shape centered in the zone 730, although the annularity is interrupted by the slits. Alternatively, the annular shape can be viewed as including a peripheral annulus of wedge-shaped heater zones surrounding a generally continuous central annulus.

Preferably, but not necessarily, the heater 726 has a non-uniform power density heater structure that can be understood with reference to FIG. 8A. In this construction, the heater 726 includes a central portion 728 (indicated by lightly drawn lines) having a first power density and a peripheral portion 729 (indicated by heavily drawn lines) which surrounds the central portion 728 and has a second power density higher than the first power density. The heater trace 724 is continuous and includes two ends, a first of which transitions to electrical pad 5, and the second to electrical pad 6. However, because of the slits, each of the central and peripheral portions 728 and 729 includes a plurality of sections arranged in a sequence, in which the sections of the central portion 728 alternate with the sections of the peripheral portion. Nevertheless, the annular structure of the heater arrays the sections of the central portion 728 generally in a central annulus around the zone 730, and arrays the sections of the peripheral portion 729 around the central portion 728. When the heater 726 is operated, the central portion 728 produces a central annulus of heat at the first power density surrounding the zone 730 and the peripheral portion 729 produces a ring-shaped annulus of heat at the second power density that surrounds the central annulus of heat.

Preferably the heater trace 724 is continuous, but exhibits a nonuniform power density along its length such that the central heater portion 728 has a first power density and the peripheral portion 729 has a second power density that is greater than the first power density. With this configuration, a driving voltage applied to the heater 726 will cause the central heater portion 728 to produce less power per unit of heater area of the heater trace than the outer heater portion 729. The result will be a central annulus of heat at a first average power surrounded by a ring of heat a second average power higher than the first.

The differing power densities of the heater portions 728 and 729 may be invariant within each portion, or they may vary. Variation of power density may be step-wise or continuous. Power density is most simply and economically established by the width of the heater trace 724 and/or the pitch (distance) between the legs of a switchback pattern. For example, the resistance, and therefore the power generated by the heater trace, varies inversely with the width of the trace. For any resistance, the power generated by the heater trace also varies inversely with the pitch of (distance between) the switchback legs.

Figure 8B:
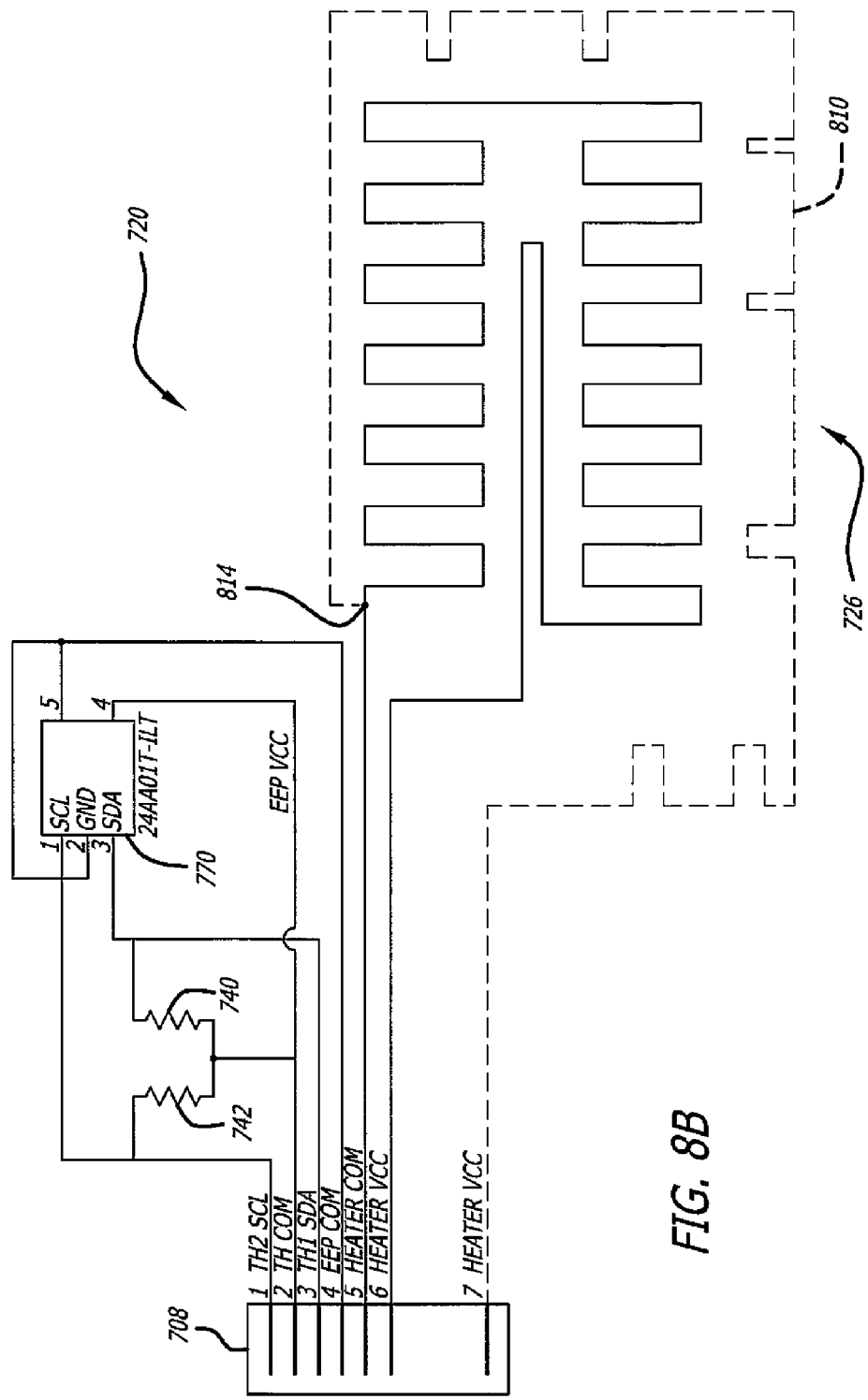
FIG. 8B is a schematic diagram including elements of the measurement device.

The electrical circuit 720 on the flexible substrate 701 seen in FIG. 8A is shown in schematic form in FIG. 8B. The electrical pads 771 on the tab 708 numbered 1-6 in FIG. 8A correspond to the identically-numbered elements in FIG. 8B. The number of electrical pads shown is merely for illustration. More, or fewer, electrical pads can be used; any specific number is determined by design choices including the specific device configuration of the thermal sensor calibration circuit, the heater construction, the number of thermal sensors, and so on. In some constructions it is desirable to utilize one or more of the electrical pads for electrical signal conduction to or from more than a single element of the electrical circuit 720 in order to minimize the number of electrical pads, thereby simplifying the circuit layout, minimizing the size and mass of the tab 708, and reducing interface connector size.

Presume that the thermal sensor calibration circuit 770 includes a multi-pin electronically programmable memory (EEPROM) such as a 24AA01T-I/OT manufactured by Microchip Technology and mounted by mounting pads to the zero-heat-flux DTT measurement device 700. FIGS. 8A and 8B illustrate a construction in which one or more electrical pads are shared by at least two elements of the electrical circuit. In this regard:

one lead of the second thermal sensor 742 and pin 1 of the thermal sensor calibration circuit 770 are connected by conductive trace portions to electrical pad 1;

leads of the first and second thermal sensors 740 and 742 and pin 4 of the thermal sensor calibration circuit 770 are connected by conductive trace portions to electrical pad 2;

one lead of the first thermal sensor 740 and pin 3 of the thermal sensor calibration circuit 770 are connected by conductive trace portions to electrical pad 3;

pins 2 and 5 of the thermal sensor calibration circuit 770 are connected by a conductive trace portion to electrical pad 4;

the return end of the heater trace 724 is connected by a conductive trace portion to electrical pad 5; and the input end of the heater trace 724 is connected by a conductive trace portion to electrical pad 6.

With reference to FIGS. 7A, 7B, and 8A, when the measurement device 700 is assembled, the center section 705 and tail 706 are folded together about a flexible layer of insulating material such as the layer 702. The layer 702 provides thermal resistance and electrical insulation between the thermal sensors; it also supports the thermal sensors in a spaced-apart configuration. In other words, the first and second thermal sensors 740 and 742 are disposed on respective layers of substrate material that are separated by the layer of insulating material with the heater and first thermal sensor facing one side of the layer of insulating material and the second thermal sensor facing the other.

The zero-heat-flux DTT measurement device 700, with the electrical circuit 720 laid out on one or more sides of the flexible substrate 701 as illustrated in FIG. 8A, can be manufactured and assembled in the manner illustrated in FIGS. 5 and 6A-6F, using materials identified in the Table of Materials and Parts II. Preferably, the measurement device is constructed with a stiffener comprising a separate piece or a layer of material painted, deposited, or formed on the tab 708 and then hardened. The stiffener reduces the flexibility of the tab 708, thereby enabling it to be reliably coupled to and decoupled from a connector. Preferably, with reference to FIGS. 4 and 8A, such a stiffener for the tab 708 (FIG. 8A) is disposed on the side of the flexible substrate 701 that corresponds to the second side 109 of the flexible substrate 100 (FIG. 4). The stiffener extends substantially coextensively with the tab 708, and at least partially over the center section 705, but stops short of the zone 730, approximately where indicated by the dashed line 711 in FIG. 8A.

Figure 9:
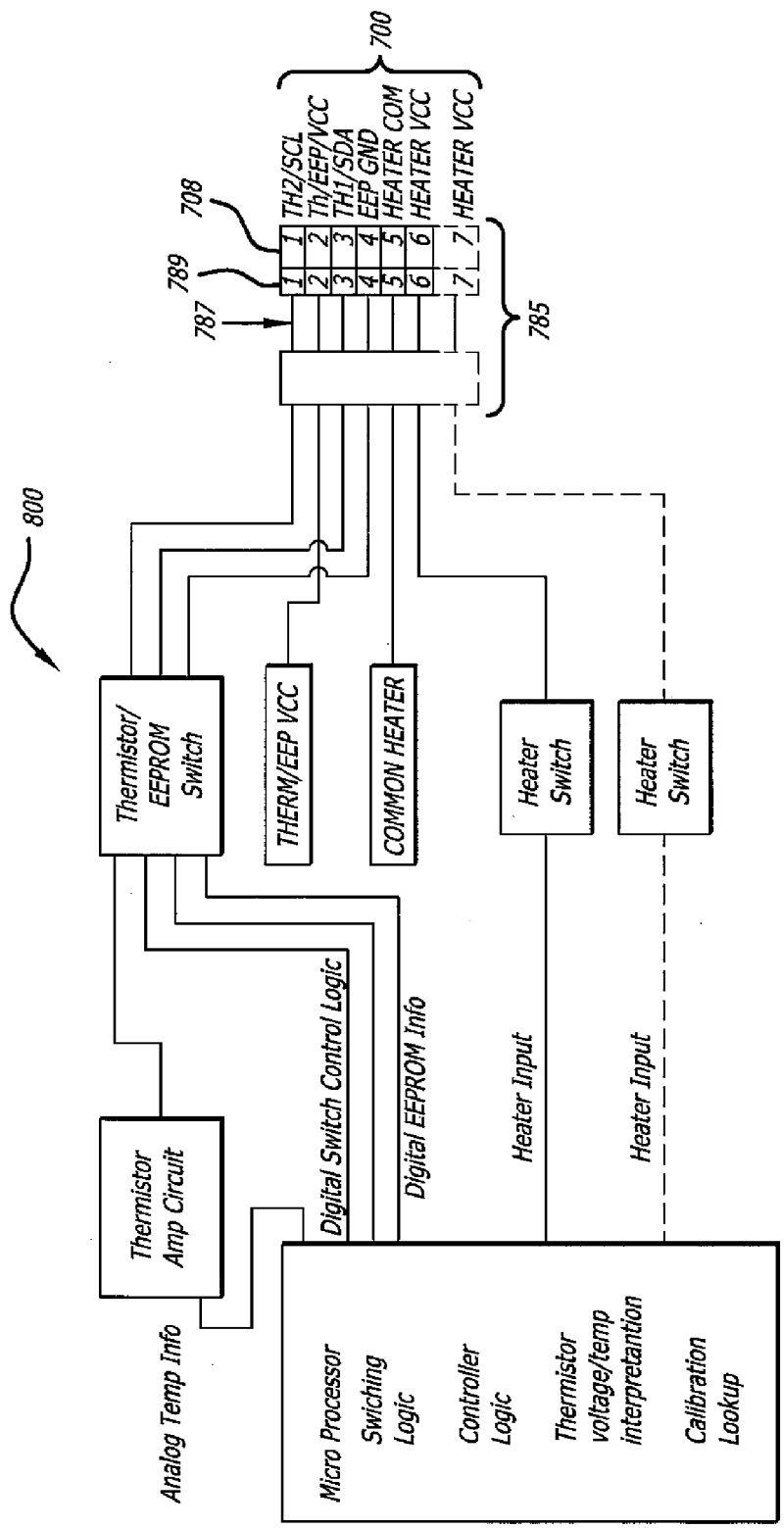
FIG. 9 is a block diagram illustrating a temperature measurement system.

The physical layout of FIG. 8A and the corresponding electrical circuit of FIG. 8B illustrate an interface by which operation of a zero-heat-flux DTT measurement device with a thermal sensor calibration circuit can be controlled and monitored in a DTT measurement system. FIG. 9 illustrates a signal interface between a zero-heat-flux DTT measurement device according to FIGS. 7A and 7B, using the first construction of FIG. 8A as an example. With reference to these figures, a DTT measurement system includes control mechanization 800, a measurement device 700, and an interface 785 that transfers power, common, and data signals between the control mechanization and the measurement device. The interface can be wireless, with transceivers located to send and receive signals. Preferably, the interface includes a cable 787 with a connector 789 releasably connected to the tab 708. The control mechanization 800 manages the provision of power and common signals on respective signal paths to the heater and provides for the separation of the signals that share a common signal path, such as the Thermistor2 (TH2) and SCL signals. A common reference voltage signal is provided on a single signal path to the thermal sensors, and respective separate return signal paths provide sensor data from the thermal sensors.

Presuming that the thermal sensor calibration circuit 770 includes an EEPROM, a separate signal path is provided for EEPROM ground, and the thermal sensor signal paths are shared with various pins of the EEPROM as per FIGS. 8A and 8B. This signal path configuration separates the digital ground for the EEPROM from the DC ground (common) for the heater, for good reason. Presume that the EEPROM and the heater share an electrical pad for ground. The cable 787 including its connector contacts has a certain amount of resistance. If the heater 726 is powered up, the current through it has to return to the control mechanization 800 through the ground (common) contact, which means there will be some voltage developed on the measurement device side of the contact equal to the resistance of that line multiplied by the current through the heater 726. That voltage could be as high as 2 or 3 volts depending on the integrity of the contacts. If concurrently the supply voltage goes low on the EEPROM or even one of the logic lines goes low below this aforementioned generated voltage, the EEPROM would be reversed biased which could damage the part. Separating the heater and EEPROM grounds eliminates all these possibilities for damage to the EEPROM. Accordingly, it is desirable to electrically isolate the heater altogether from the other elements of the electrical circuit. Thus, as per FIG. 9, a first electrical pad (electrical pad 5, for example) of the plurality of electrical pads is connected only to a first terminal end of the heater trace, while a second electrical pad (electrical pad 6, for example) of the plurality of electrical pads is connected only to the second terminal end of the heater trace.

With reference to FIG. 8B, presume that the thermal sensors are NTC thermistors. In this case, the common signal on electrical pad 2 is held at a constant voltage level to provide Vcc for the EEPROM and a reference voltage for the thermistors. Control is switched via the thermistor/EEPROM switch circuit between reading the thermistors and clocking/reading/writing the EEPROM. Presuming again that the thermal sensors are NTC (negative temperature coefficient) thermistors, the EEPROM has stored in it one or more calibration coefficients for each thermistor. When the device 700 is connected to the control mechanization, the calibration coefficients are read from the EEPROM through the SDA port in response to a clock signal provided to the SCL port of the EEPROM. The following Table of Signals and Electrical Characteristics summarizes an exemplary construction of the interface 785.

| Table of Signals and Electrical Characteristics | |
| --- | --- |
| Element | Signals and Electrical Characteristics |
| Thermal sensors 740, 742 | Common reference signal is 3.3 volts DC. Outputs are analog. |
| Heater 726 | Total resistance 6.5 to 7.0 ohms driven by a pulse width modulated waveform of 3.3 volts DC. The power density of the peripheral portion 729 is 30%-60% higher than that of the center portion 728. |
| EEPROM 770 (Micron Technology 24AA01T-I/OT) | Ground is 0 volts. Vcc is 3.3 volts DC. SCL and SDA pins see a low impedance source switched in parallel with the thermistor outputs. |

In a best mode of practice, a temperature measurement device according to FIG. 8A has been fabricated using the materials and parts listed in the following table. An electrical circuit with copper traces and pads was formed on a flexible substrate of polyimide film by a conventional photo-etching technique and thermal sensors were mounted using a conventional surface mount technique. The dimensions in the table are thicknesses, except that Ø signifies diameter. Of course, these materials and dimensions are only illustrative and in no way limit the scope of this specification. For example, the traces may be made wholly or partly with electrically conductive ink. In another example, the thermal sensors are preferably thermistors, but PN junctions, thermocouples, or resistance temperature detectors can also be used.

Table of Materials and Parts: II

| Element | Material/Part | Representative dimensions/characteristics |
| --- | --- | --- |
| Flexible substrate 701, heater 726, contacts, and pads | 2 mil thick Polyethylene terephthalate (PET) film with deposited and photo-etched ½ oz. copper traces and pads and immersion silver-plated contacts. | Substrate 701: 0.05 mm thick |
| Thermal sensors 740, 742 | Negative Temperature Coefficient (NTC) thermistors, Part # R603-103F-3435-C, Redfish Sensors. | 10k thermistors in 0603 package. |
| Flexible insulating layers 702, 709 | Closed cell polyethylene foam with skinned major surfaces coated with pressure sensitive adhesive (PSA) | Insulator 702: Ø40 x 3.0 mm thick<br>Insulator 709: Ø40 x 3.0 mm thick |
| Stiffener | 10 mil thick PET film | Stiffener: 0.25 mm thick |
| EEPROM 770 | Micron Technology 24AA01T-I/OT | |

According to the best mode, calibration coefficients for the thermistors are obtained and stored in the EEPROM. The basis of obtaining accurate temperature sensing from the negative temperature coefficient thermistors is through calibration. The resistance of each thermistor decreases in a generally logarithmic relationship as temperature increases. Two models exist which provide adequate precision to result in ±0.05° C. temperature accuracy over a 70° C. span [Fraden, J., "A two-point calibration of negative temperature coefficient thermistors," Rev Sci Instru 71(4):1901-1905]. The best known is the Steinhart and Hart model:

$$T = [b_0 + b_1 \ln R + b_2 (\ln R)^2]^{-1} \qquad \text{Equation 1}$$

which relates resistance, R, to temperature, T, as a function of three constants, $b_0$, $b_1$, and $b_3$. Calibration entails placing the DTT measurement device in three successively higher thermally controlled environments and recording the resistance at each condition. The constants may then be solved for using three simultaneous equations. The three resulting constants for each individual thermistor are then recorded on the EEPROM on the DTT measurement device.

A simplified model by Fraden, is of the form:

$$\ln R \cong R_0 + \frac{\beta_0[1 + \gamma(T - T_0)]}{T} \qquad \text{Equation 2}$$

where the terms, $\beta_0$, $\gamma$, $R_0$, and $T_0$ are constants for a given sensor. The beta and gamma terms are related by the form:

$$\gamma = \frac{\left(\frac{\beta_1}{\beta_0} - 1\right)}{T_1 - T_0}. \qquad \text{Equation 3}$$

The value of gamma is a normalized slope of beta. This is a linear relationship and gamma may be approximated as a constant for a given thermistor type. Calibration using the model proposed by Fraden thus entails placing the DTT measurement device in only two successively higher-temperature-controlled environments and recording the resistance at each temperature. The $R_0$ and $T_0$ are one of those sets of measured values. The four constants noted above for each individual thermistor are then recorded on the EEPROM on the DTT measurement device.

Figure 10:
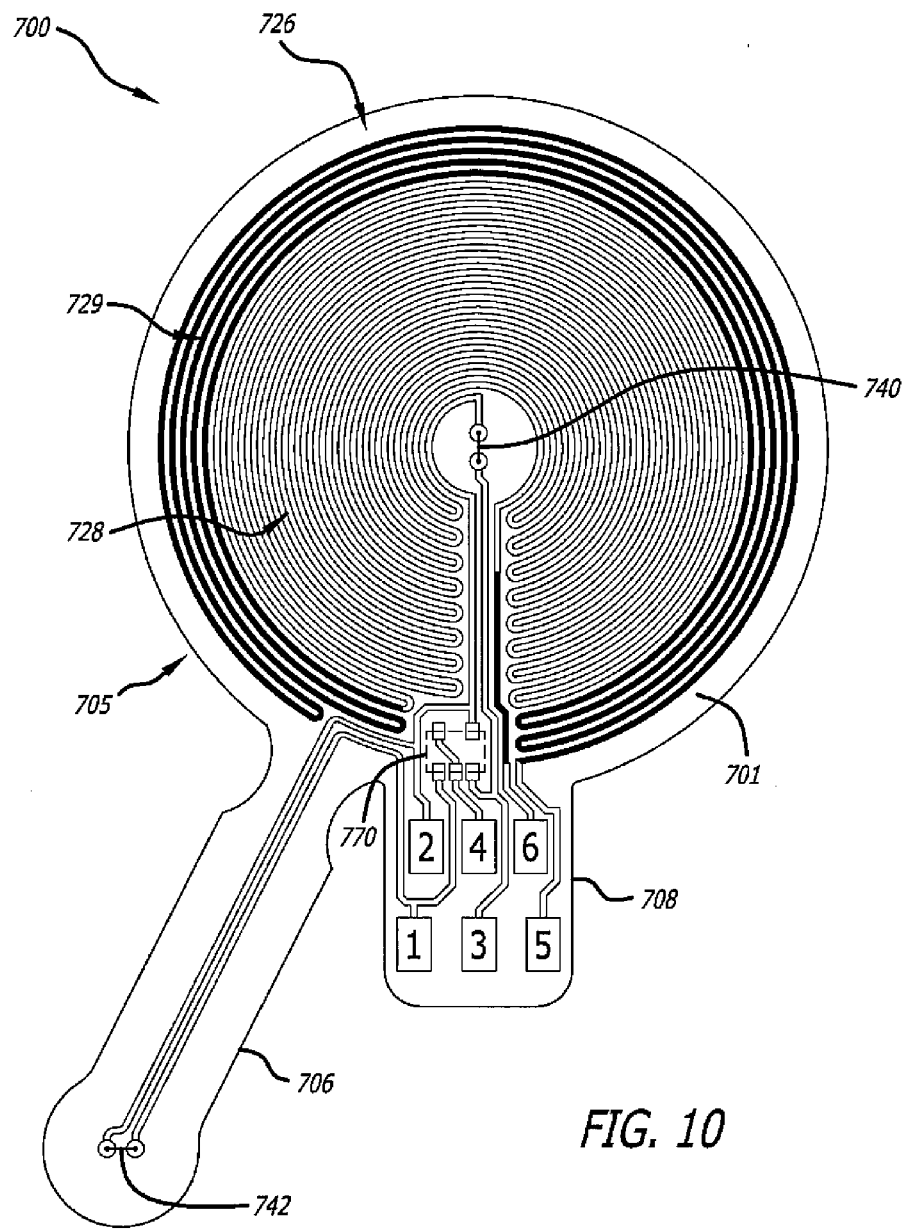
FIG. 10 illustrates a second construction of the zero-heat-flux DU measurement device construction of FIG. 7.

In a second construction of the measurement device 700, illustrated in FIG. 10, no slits are provided in the substrate 701, and so the heater 726 includes continuous central and peripheral portions 728 and 729 with different power densities. Six electrical pads having the same connections as shown in FIGS. 8A and 8B are provided on the tab 708.

Figure 11:
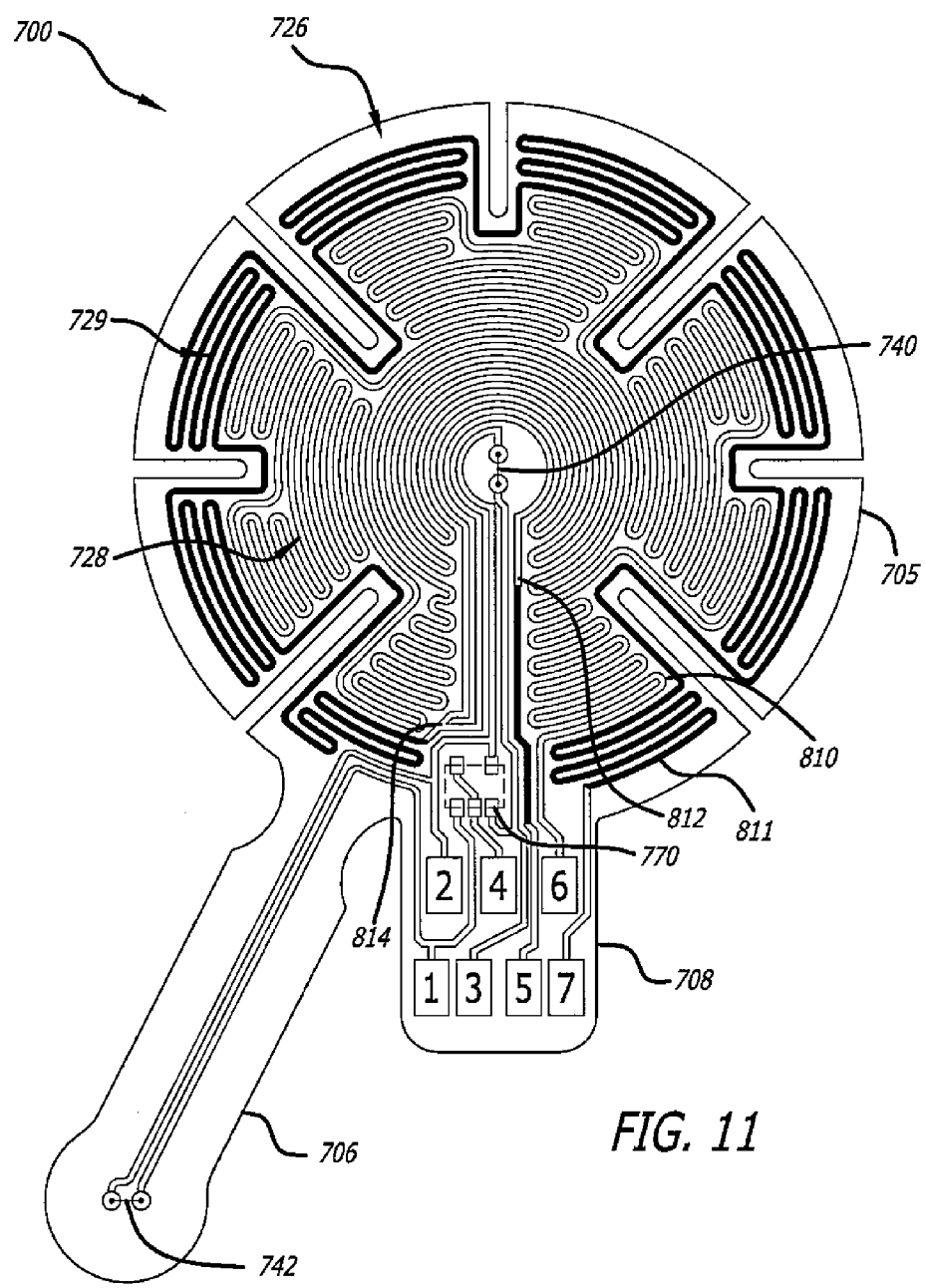
FIG. 11 illustrates a third construction of the zero-heat-flux DTT measurement device construction of FIG. 7.
Figure 12:
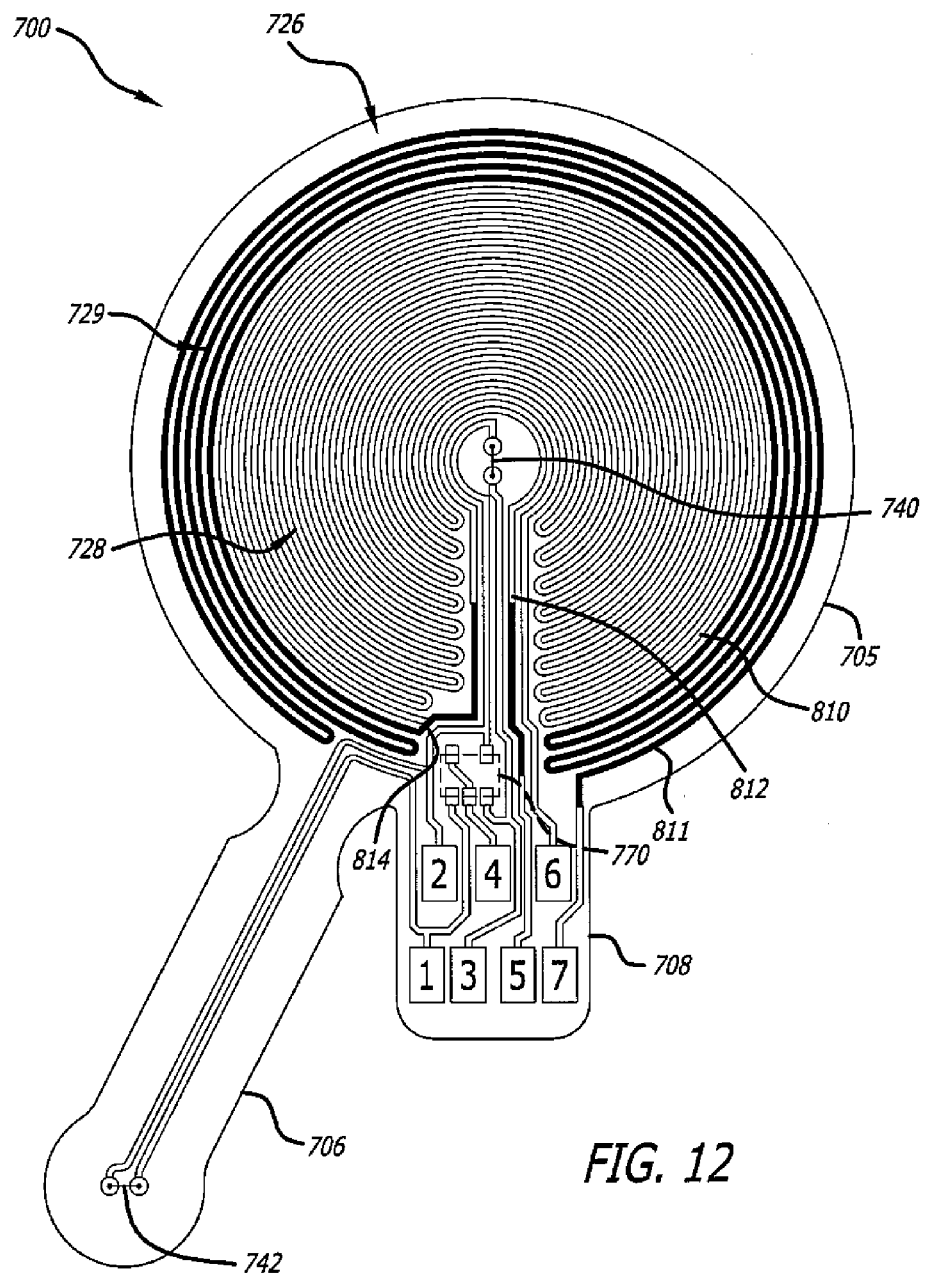
FIG. 12 illustrates a fourth construction of the zero-heat-flux DTT measurement device construction of FIG. 7.

In third and fourth constructions of the measurement device 700, illustrated in FIGS. 11 and 12, respectively, the heater trace includes three traces: a first trace 810 that defines the central heater portion 728, a second trace 811, surrounding the first trace 810, that defines the peripheral heater portion 729, and a third trace 812 connected to the first and second traces at a shared node 814. The third trace 812 serves as a common connection between the first and second traces. This heater construction is thus constituted of independently-controlled central and peripheral heater portions that share a common lead. Alternatively, the construction can be considered as a heater with two heater elements. The power densities of the central and peripheral portions can be uniform or non-uniform. If the power densities of the two portions are uniform, the peripheral portion can be driven at a higher power level than the central portion so as to provide the desired higher power density. As per FIGS. 8B, 9, 11, and 12 the second heater construction requires three separate pins (6, 7, and 5) for the first, second, and third traces. Thus, for a construction of the electrical circuit that includes two independently-controlled heater portions that share a common lead, seven electrical pads are provided on the tab 708. As with the first heater construction, the heaters of the second heater construction are entirely electrically isolated from the other elements of the electrical circuit. In this regard, with reference to FIGS. 9 and 11, the heater trace 726 includes three terminal ends and a first electrical pad (electrical pad 5, for example) of the plurality of electrical pads is connected only to a first terminal end of the heater trace, a second electrical pad (electrical pad 6, for example) of the plurality of electrical pads is connected only to the second terminal end of the heater trace, and a third electrical pad (electrical pad 7, for example) of the plurality of electrical pads is connected only to the third terminal end of the heater trace.

Figure 13:
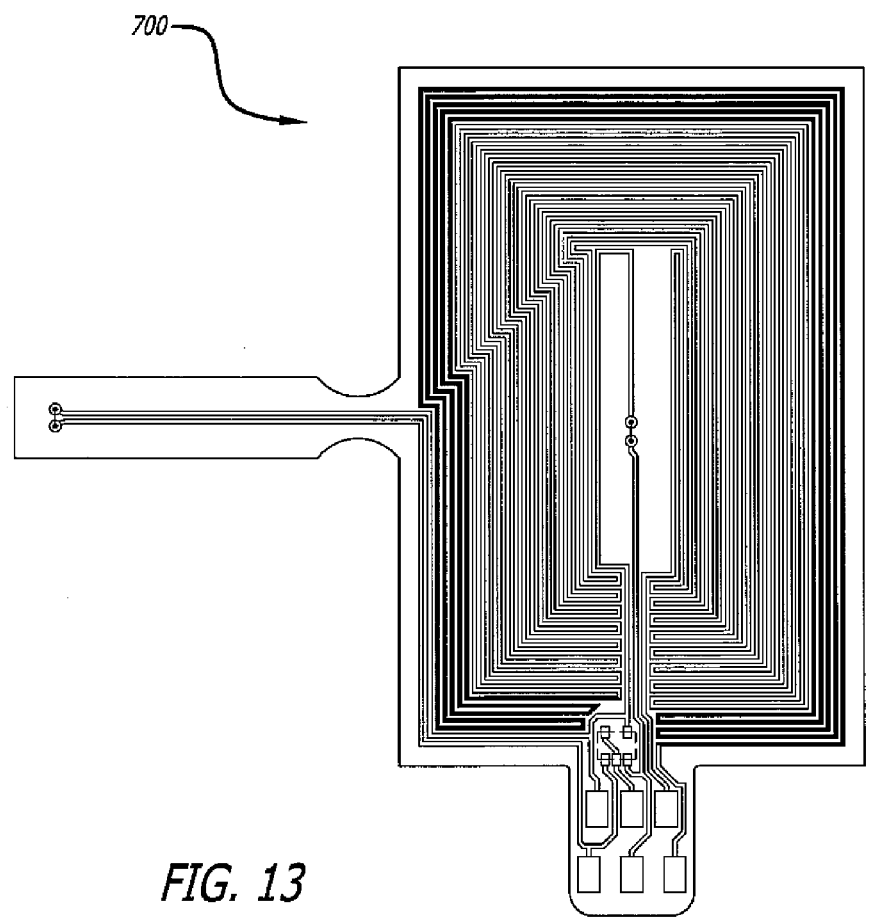
FIG. 13 illustrates a fifth construction of the zero-heat-flux DTT measurement device construction of FIG. 7.
Figure 14:
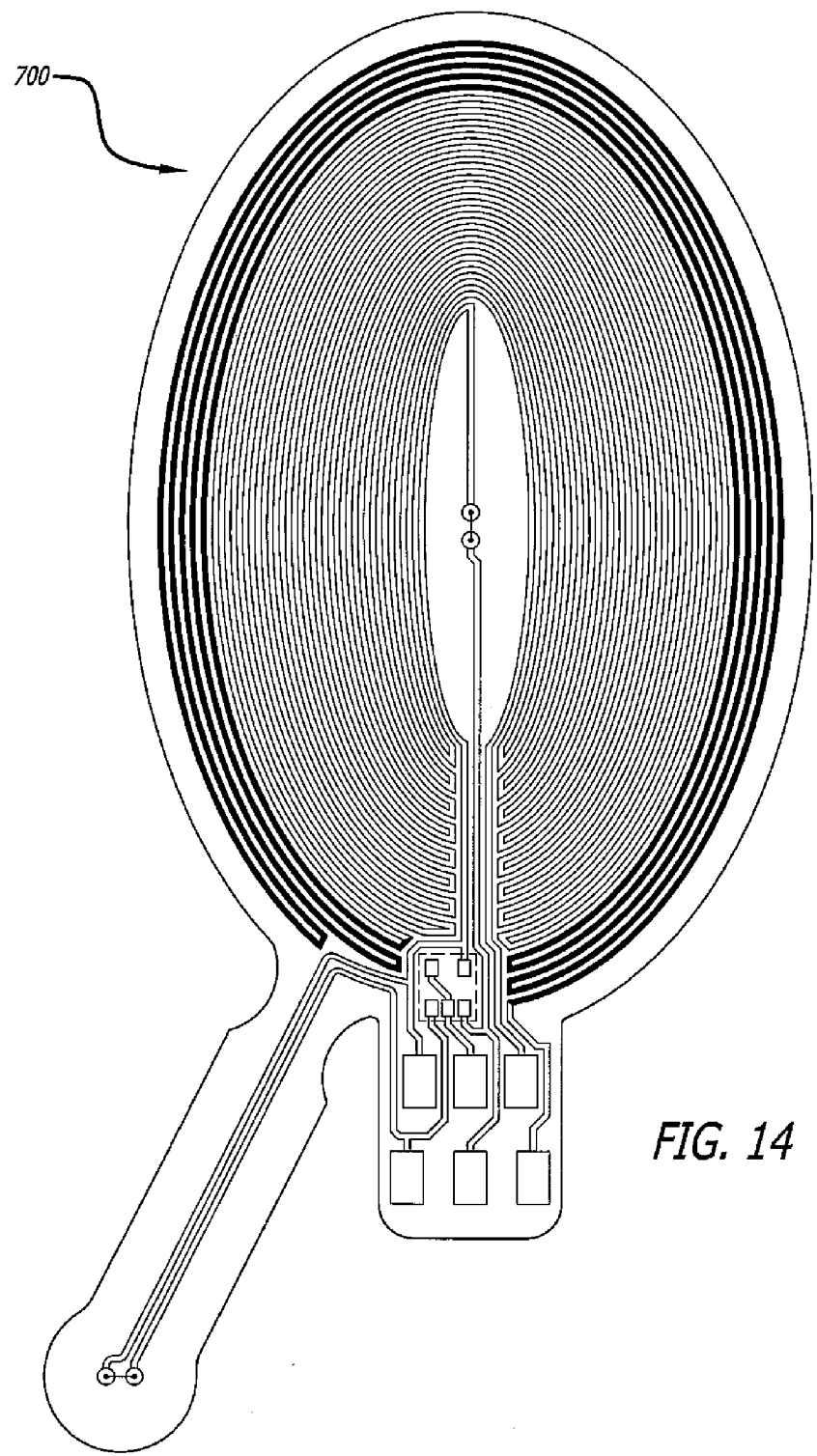
FIG. 14 illustrates a sixth construction of the zero-heat-flux DTT measurement device construction of FIG. 7.

It is not necessary that the flexible substrate be configured with a circular central section, nor is it necessary that the annular heater be generally circular. In ninth and tenth constructions of the measurement device 700, illustrated in FIGS. 13 and 14, respectively, the central substrate sections have multilateral and oval (or elliptical) shapes, as do the heaters. All of the constructions previously described can be adapted to these shapes as required by design, operational, or manufacturing considerations.

Although principles of temperature measurement device construction and manufacture have been described with reference to presently preferred embodiments, it should be understood that various modifications can be made without departing from the spirit of the described principles. Accordingly, the principles are limited only by the following claims.

The invention claimed is:

1. A zero-heat-flux temperature device with first and second flexible substrate layers sandwiching a layer of thermally insulating material, comprising:
   a heater trace disposed on the first substrate layer defining a heater surrounding a zone of the first substrate layer having no heater trace,
   a first thermal sensor disposed in the zone of the first substrate layer having no heater trace,
   a thermal sensor calibration device,
   a second thermal sensor disposed on the second substrate layer,
   a plurality of connection pads, and a plurality of conductive traces connecting the heater trace and the first and second thermal sensors with the plurality of connection pads.

2. The zero-heat-flux temperature device of claim 1, in which the thermal sensor calibration device includes a programmable memory.

3. The zero-heat-flux temperature device of claim 1, in which the flexible substrate includes a center section, a tab extending outwardly from the periphery of the center section, and a tail extending outwardly from the periphery of the center section, the plurality of connection pads is disposed on the tab, and the center section and the tail are folded around the layer of thermal insulating material such that the center section constitutes the first substrate layer and the tail constitutes the second substrate layer.

4. The zero-heat-flux temperature device of claim 3, in, which the thermal sensor calibration device is disposed on a surface portion of the substrate extending partially over the tab and the center section.

5. The zero-heat-flux temperature device of claim 4, in which the thermal sensor calibration device includes a programmable memory.

6. The zero-heat-flux temperature device of claim 3, in which the thermal sensor calibration device is disposed between the heater and the plurality of connection pads.

7. The zero-heat-flux temperature device of claim 6, in which the plurality of conductive traces includes conductive traces connecting the thermal sensor calibration device with connection pads of the plurality of connection pads.

8. The zero-heat-flux temperature device of claim 3, in which the tab includes opposing notches.

9. The zero-heat-flux temperature device of claim 8, in which the annular heater trace includes two terminal ends and a first connection pad of the plurality of connection pads is connected only to a first terminal end of the heater trace and a second connection pad of the plurality of connection pads is connected only to the second terminal end of the heater trace.

10. The zero-heat-flux temperature device of claim 8, in which the annular heater trace includes three terminal ends and a first connection pad of the plurality of connection pads is connected only to a first terminal end of the heater trace, a second connection pad of the plurality of connection pads is connected only to the second terminal end of the heater trace, and a third connection pad of the plurality of connection pads is connected only to the third terminal end of the heater trace.

11. A temperature device, comprising:
   a flexible substrate; and,
   an electrical circuit on the flexible substrate, the electrical circuit including an annular heater trace surrounding a zone of the flexible substrate having no heater trace, a first thermistor disposed in the zone of the flexible substrate having no heater trace, a second thermistor disposed outside of the annular heater trace, a thermistor calibration device, a plurality of connection pads, and a plurality of conductive traces connecting the first and second thermistors, the thermistor calibration device, and the annular heater trace with the plurality of connection pads.

12. The temperature device of claim 11, in which the plurality of connection pads includes six or seven connection pads.

13. The temperature device of claim 11, in which the thermistor calibration device is a programmable memory device storing thermistor calibration coefficients.

14. The temperature device of claim 11, in which the thermistor calibration device is disposed on a surface portion of the flexible substrate between the heater trace and the connection pads.

15. The temperature device of claim 14, in which the thermistor calibration device is a programmable memory device storing thermistor calibration coefficients.

16. The temperature device of claim 15, in which the plurality of connection pads includes six or seven connection pads.

* * * * *

UNITED STATES PATENT AND TRADEMARK OFFICE
CERTIFICATE OF CORRECTION

PATENT NO. : 8,801,272 B2  
APPLICATION NO. : 13/615218  
DATED : August 12, 2014  
INVENTOR(S) : Bieberich et al.

Page 1 of 1

It is certified that error appears in the above-identified patent and that said Letters Patent is hereby corrected as shown below:

Title Page, Item (75) Inventor is corrected to read:
-- Mark T. Bieberich, Edina (MN);
Gary L. Hansen, Eden Prairie (MN);
Ryan J. Staab, Minneapolis (MN);
Albert P. Van Duren, Chaska (MN);
Allen H. Ziaimehr, Arden Hills (MN);
Timothy J. Prachar, Menlo Park (CA);
David R. Palchak, Brisbane (CA) --.

Signed and Sealed this
Fourteenth Day of June, 2016

Michelle K. Lee
*Director of the United States Patent and Trademark Office*